US012575652B2

(12) United States Patent
Oldani

(10) Patent No.: US 12,575,652 B2
(45) **Date of Patent: *Mar. 17, 2026**

(54) KICKSTAND FOR COMPUTING DEVICE

(71) Applicant: Microsoft Technology Licensing, LLC, Redmond, WA (US)

(72) Inventor: Michael Gordon Oldani, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/301,843

(22) Filed: Apr. 17, 2023

(65) Prior Publication Data

US 2024/0341427 A1 Oct. 17, 2024

(51) Int. Cl.

| | |
|---|---|
| ***G06F 1/16*** | (2006.01) |
| ***A45C 11/00*** | (2006.01) |
| ***H01F 7/02*** | (2006.01) |

(52) U.S. Cl.

CPC ................ *A45C 11/00* (2013.01); *H01F 7/02* (2013.01); *A45C 11/002* (2025.01); *A45C 11/003* (2025.01); *A45C 2200/15* (2013.01)

(58) Field of Classification Search

CPC .............. A45C 11/00; A45C 2011/002; A45C 2011/003; A45C 2200/15; H01F 7/02

See application file for complete search history.

(56) References Cited

U.S. PATENT DOCUMENTS

| | | | | |
|---|---|---|---|---|
| 10,606,314 | B1 | 3/2020 | Takano | |
| 12,072,740 | B2 * | 8/2024 | Oldani | G06F 1/1616 |
| 2010/0309627 | A1 | 12/2010 | Noma et al. | |
| 2011/0031287 | A1 | 2/2011 | Le Gette et al. | |
| 2013/0286623 | A1 | 10/2013 | Slipy et al. | |
| 2014/0262854 | A1 | 9/2014 | Chen et al. | |
| 2017/0027069 | A1 | 1/2017 | Yu et al. | |
| 2018/0052498 | A1 | 2/2018 | Nakagaki | |
| 2019/0107245 | A1 | 4/2019 | Torres | |
| 2019/0278324 | A1 | 9/2019 | Yoon | |
| 2019/0335258 | A1 | 10/2019 | Vaturi | |
| 2021/0112673 | A1 | 4/2021 | Justin | |
| 2021/0311523 | A1 * | 10/2021 | Bai | H05K 5/0226 |

(Continued)

OTHER PUBLICATIONS

International Search Report and Written Opinion received for PCT Application No. PCT/US2023/035757, mailed on Jan. 26, 2024, 13 pages.

(Continued)

*Primary Examiner* — Amy J. Sterling
(74) *Attorney, Agent, or Firm* — Alleman Hall LLP

(57) ABSTRACT

A kickstand assembly comprises a backplate comprising a backplate retention magnet having a first magnetic pole orientation and an upper kickstand plate slidably connected to the backplate. A return biaser biases the upper kickstand plate toward a rest position. A lower kickstand plate is rotatably coupled to the upper kickstand plate, with the lower kickstand plate comprising a closing magnet having a second magnetic pole orientation that attracts the first magnetic pole orientation of the backplate retention magnet. A deployment biaser biases the lower kickstand plate to rotate away from the backplate when the upper kickstand plate is translated away from the rest position.

19 Claims, 15 Drawing Sheets

(56) References Cited

U.S. PATENT DOCUMENTS

| | | | | | |
|---|---|---|---|---|---|
| 2022/0197352 | A1 | 6/2022 | Nishi | | |
| 2022/0413550 | A1 | 12/2022 | Huang | | |
| 2023/0044946 | A1 * | 2/2023 | Watamura | ............. | G06F 1/1626 |
| 2023/0119798 | A1 | 4/2023 | Atom | | |
| 2023/0195176 | A1 * | 6/2023 | Perelli | ..................... | G06F 1/166<br>361/679.01 |
| 2024/0004426 | A1 | 1/2024 | Yamada | | |
| 2024/0201734 | A1 | 6/2024 | Park | | |
| 2024/0201747 | A1 | 6/2024 | Oldani | | |
| 2024/0385657 | A1 * | 11/2024 | Balaji | .................. | A45C 13/005 |

OTHER PUBLICATIONS

Notice of Allowance mailed on Apr. 22, 2024, in U.S. Appl. No. 18/069,180, 09 pages.
International Preliminary Report on Patentability (Chapter I) received for PCT Application No. PCT/US2023/036323, mailed on Jul. 3, 2025, 9 pages.
Non-Final Office Action mailed on Sep. 3, 2024, in U.S. Appl. No. 18/186,031, 08 pages.
Notice of Allowance mailed on Jan. 21, 2025, in U.S. Appl. No. 18/186,031, 08 pages.

* cited by examiner

KICKSTAND FOR COMPUTING DEVICE

BACKGROUND

Portable computing devices can be utilized in a variety of positions and orientations for different use cases.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

Examples are disclosed and further described below that relate kickstand assemblies for computing devices. In one example, a kickstand assembly for a portable computing device comprises a backplate comprising a backplate retention magnet having a first magnetic pole orientation. An upper kickstand plate is slidably connected to the backplate, and a return biaser biases the upper kickstand plate toward a rest position. A lower kickstand plate is rotatably coupled to the upper kickstand plate, with the lower kickstand plate comprising a closing magnet having a second magnetic pole orientation that attracts the first magnetic pole orientation of the backplate retention magnet. A deployment biaser biases the lower kickstand plate to rotate away from the backplate when the upper kickstand plate is translated away from the rest position.

Another example provides a kickstand assembly for a computing device, with the kickstand assembly comprising a backplate comprising a backplate retention magnet having a first magnetic pole orientation, a plurality of slots, and a backplate accessory magnet configured to attract a frame accessory magnet in a frame of the computing device to removably attach the kickstand assembly to the frame. An upper kickstand plate comprises a plurality of sliders that are each slidably received in one slot of the plurality of slots in the backplate. A return biaser biases the upper kickstand plate toward a rest position, and a lower kickstand plate is rotatably coupled to the upper kickstand plate. The lower kickstand plate comprises a deployment biaser that biases the lower kickstand plate to rotate away from the backplate, and a closing magnet having a second magnetic pole orientation that attracts the first magnetic pole orientation of the backplate retention magnet. The deployment biaser rotates the lower kickstand plate away from the backplate when the upper kickstand plate is translated away from the rest position.

Another example provides a method of deploying a lower kickstand plate of a kickstand assembly that is attached to a computing device. The method comprises sliding an upper kickstand plate of the kickstand assembly relative to a backplate of the kickstand assembly away from a rest position to lessen a magnetic attraction between the lower kickstand plate and the backplate. At least on condition of sliding the upper kickstand plate away from the rest position, the lower kickstand plate is caused to rotate about a connection with the upper kickstand plate away from the backplate. The upper kickstand plate is then biased back to the rest position.

DETAILED DESCRIPTION

As noted above, portable computing devices can be utilized by an end user in a variety of positions and orientations for different use cases. In some examples, a user can desire to position a portable computing device on a surface at a raised angle to the surface. For example, a user may desire to read a book or scroll through messages while resting the device on a table at an angle. In many of these cases, the user is required to prop the device at an angle against another object on the surface, which can be an inconvenient and unstable setup.

Accordingly, the present disclosure describes kickstand assemblies for a portable computing device that automatically deploy a kickstand when a user slides a portion of the assembly. As described in more detail below, kickstand assemblies of the present disclosure enable a user to easily deploy a lower kickstand plate by simply shifting the plate either laterally or vertically. Additionally, one or more return biasers bias and return the kickstand assembly to a rest position after the lower kickstand plate is deployed, thereby automatically configuring the kickstand assembly to support the portable computing device on a surface. Additionally, magnets enable the lower kickstand plate to be releasably secured to a backplate when the kickstand assembly is in the rest position to prevent the plate from undesirably deploying.

FIGS. 1-9 show one example of a kickstand assembly 10 according to aspects of the present disclosure. In the present example and as described in more detail below, the kickstand assembly 10 is removably attached to a portable computing device 12 that includes a frame 14. It will be appreciated that the portable computing device 12 is merely one example of a wide variety of computing devices with which kickstand assemblies of the present disclosure may be utilized. In other examples, kickstand assemblies of the present disclosure can be utilized with numerous other portable computing devices having different form factors, capabilities, components, and/or other features. Examples include but are not limited to smart phones, hand-held computing devices, tablets, laptops, and wearable computing devices.

Figure 1:
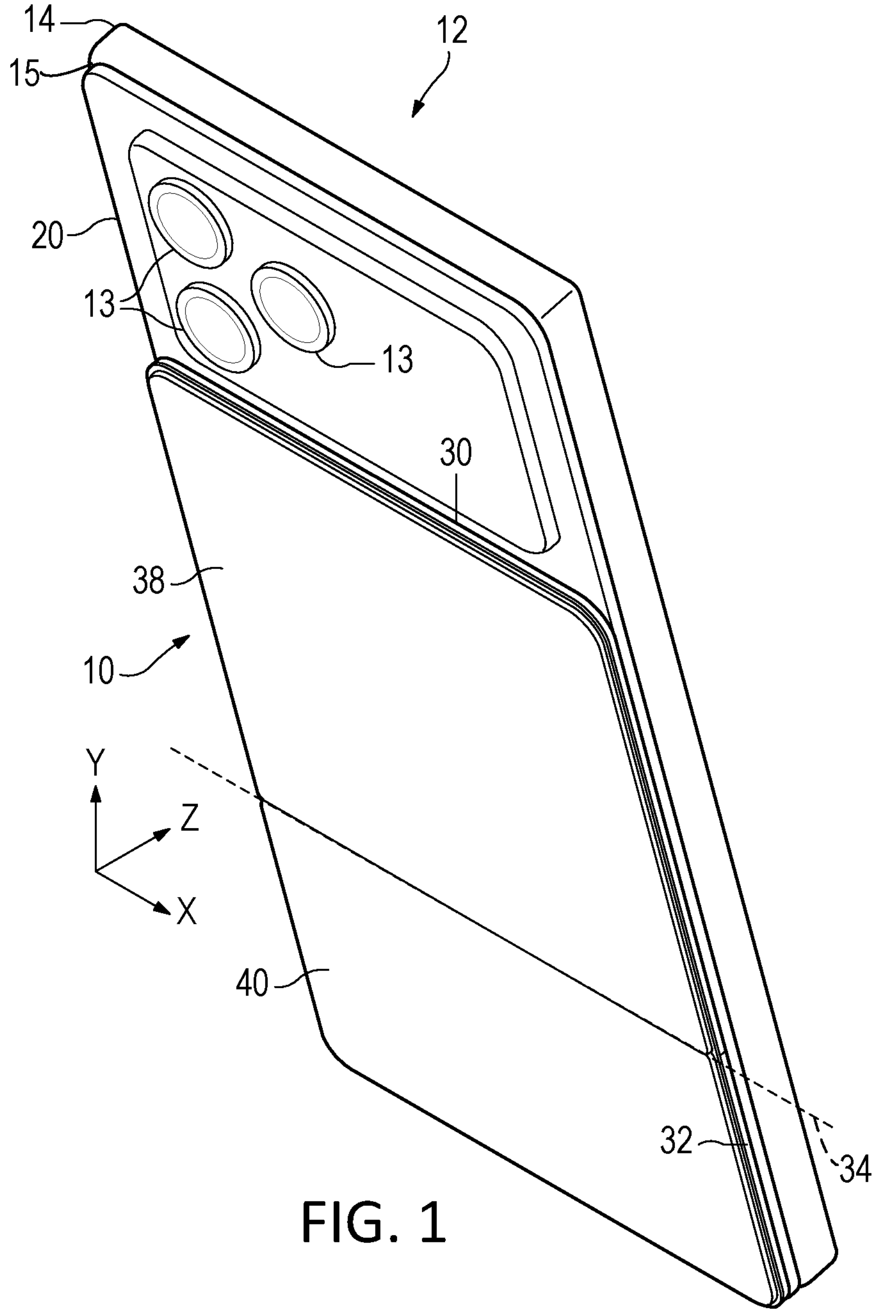
FIG. 1 shows one example of a kickstand assembly mounted to a portable computing device according to examples of the present disclosure.
Figure 2:
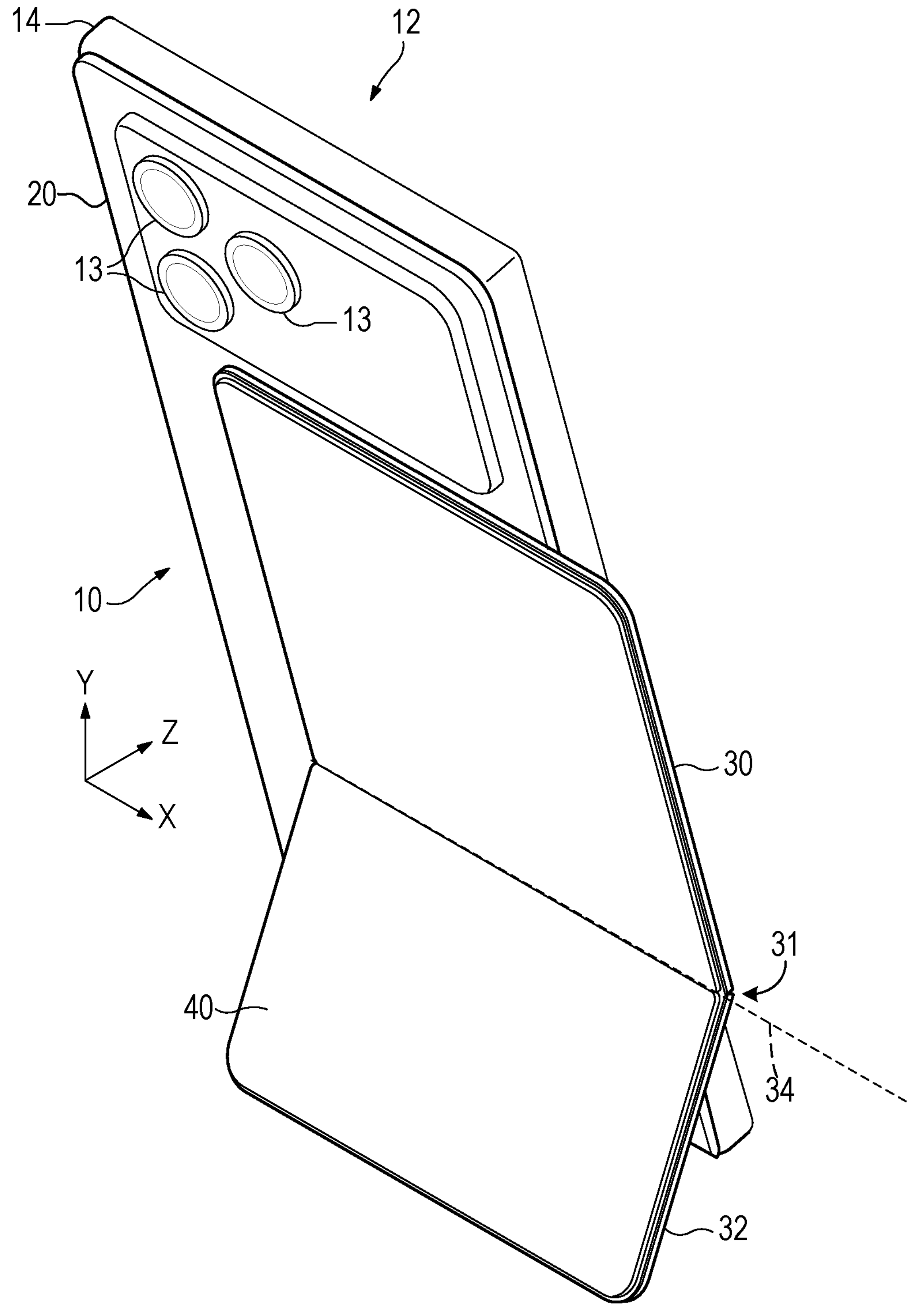
FIG. 2 shows the kickstand assembly of FIG. 1 in a mid-deployed position.
Figure 9:
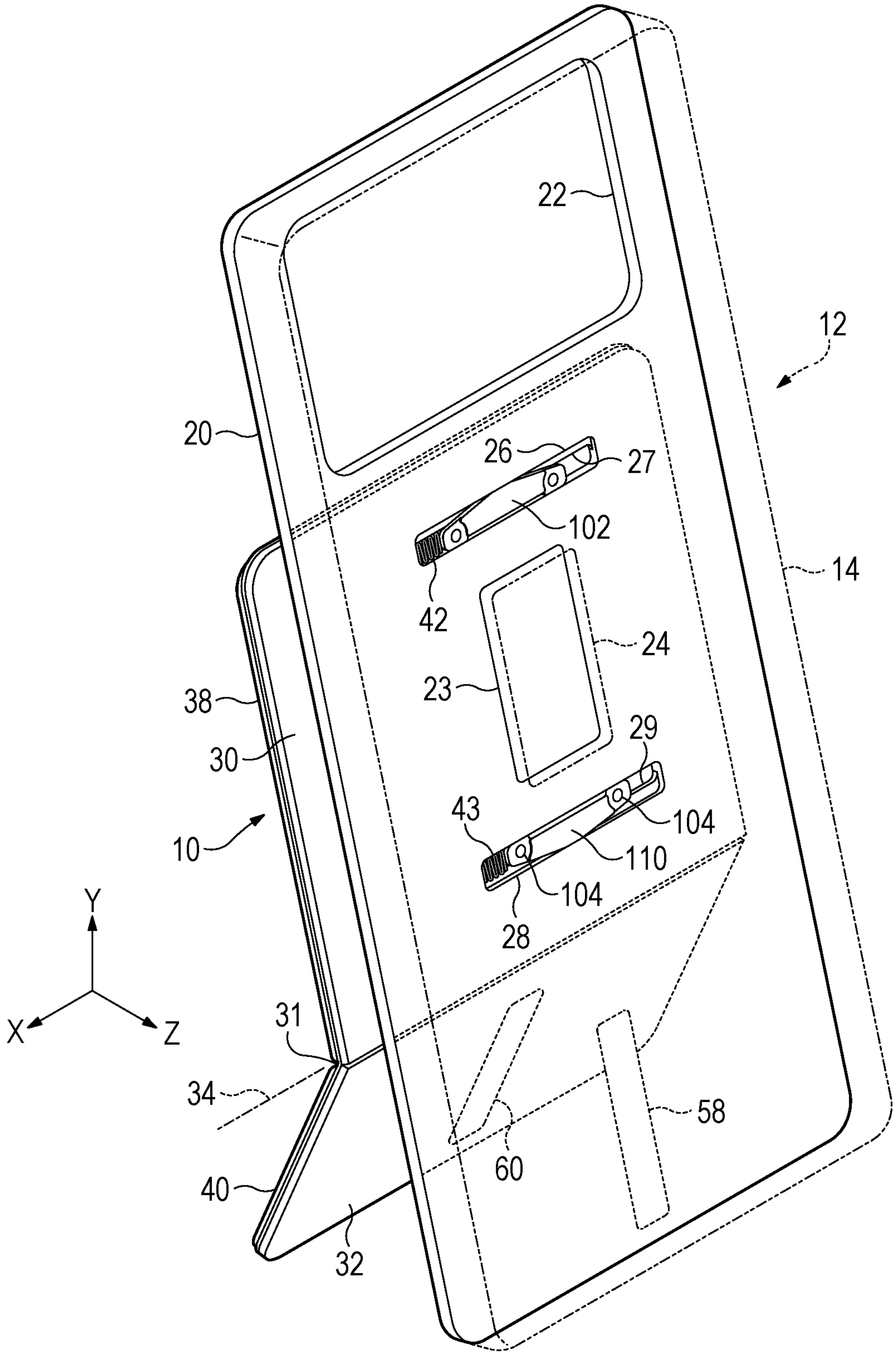
FIG. 9 shows another view of the kickstand assembly of FIG. 4 in the mid-deployed position.

In the present example and with reference to FIGS. 1, 2, and 9, the kickstand assembly 10 comprises a backplate 20 that includes a window 22. In this example, when the backplate 20 is installed onto the rear face 15 of the frame 14 as shown in FIGS. 1 and 2, a plurality of camera lenses 13 protruding from the rear face of the frame 14 are located within the window 22. In this example, and in one potential advantage of the present disclosure, the backplate 20 is a separate structure that is removably attached to the portable computing device 12. More particularly, in this example and with reference to FIGS. 5 and 9, the backplate comprises a backplate accessory magnet 23 that is configured to attract a corresponding frame accessory magnet 24 located in the frame 14 of the portable computing device 12. Advantageously, this configuration allows a user to conveniently and easily attach or detach the kickstand assembly 10 from the portable computing device 12.

In other examples, the backplate accessory magnet 23 can be positioned in a variety of other locations in the backplate 20 to correspond with a location of a corresponding frame accessory magnet 24 in the first frame of the portable computing device. Additionally or alternatively, other examples of kickstand assemblies of the present disclosure can include one or more additional backplate accessory magnet(s) that are located and configured to attract one or more additional corresponding frame accessory magnet(s) in a frame of a portable computing device.

In other examples, kickstand assemblies of the present disclosure are integrated into the frame of the portable computing device (i.e., not removable). In one example and with reference now to FIG. 4, the backplate of a kickstand assembly 10' is also the rear face 15 of the frame 14 of the portable computing device 12. In this example and as described in more detail below, the kickstand assembly 10' translates relative to the frame 14 within first and second slots located in the rear face 15 of the first frame.

With reference now to FIGS. 1-3, 5, and 9, as described further below and in another potential advantage of the present disclosure, the kickstand assembly 10 includes magnets that releasably retain a lower kickstand plate 32 against the backplate 20 when the kickstand assembly is in a rest position (shown in FIGS. 1 and 5), and that enable the lower kickstand plate to automatically deploy when a user laterally slides the assembly from the rest position to a mid-deployed position (shown in FIGS. 2 and 9). Additionally, and in another potential advantage of the present disclosure, a return biaser biases the upper kickstand plate back toward and into the rest position when a user releases the assembly. Advantageously, in this manner the kickstand assembly 10 enables a user to easily and conveniently deploy the lower kickstand plate by simply laterally sliding an upper kickstand plate relative to the underlying backplate 20.

In the present example and with reference to FIGS. 2 and 9, the kickstand assembly 10 comprises an upper kickstand plate 30 that is rotatably coupled to a lower kickstand plate 32 at an axis of rotation 34. In this example, the upper kickstand plate 30 and lower kickstand plate 32 are rotatably coupled via a living hinge 31 that is pre-loaded to bias the lower kickstand plate to rotate away from the backplate 20. In this manner, the living hinge 31 comprises a deployment biaser that biases the lower kickstand plate 32 away from the backplate 20. In other examples, the deployment biaser can additionally or alternatively include a leaf spring, elastomeric member, or any other suitable biaser element that biases the lower kickstand plate 32 to rotate away from the backplate 20.

Figure 8:
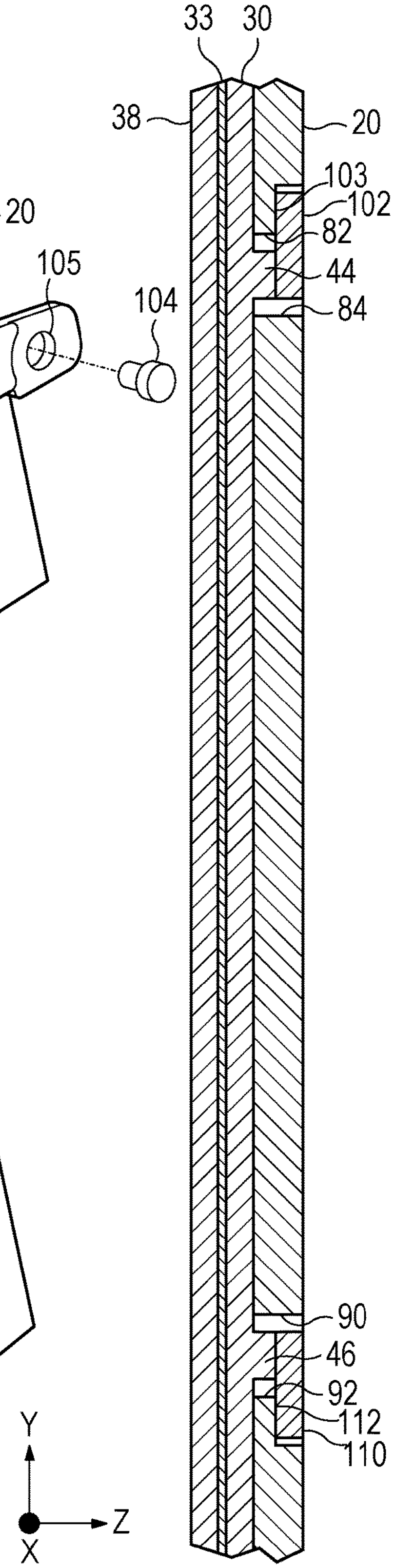
FIG. 8 shows a cross-section view taken along lines 8-8 in FIG. 5.

With reference also to FIG. 8, in this example the living hinge 31 comprises a flexible substrate 33, such as a polyester film, to which the upper kickstand plate 30 and lower kickstand plate 32 are affixed, such as via an adhesive. In other examples, a variety of other materials and structures can be utilized to rotatably couple the upper kickstand plate 30 to the lower kickstand plate 32. Advantageously, in this configuration, when the upper kickstand plate 30 is laterally translated in the positive x-axis direction relative to the backplate 20, pre-loaded living hinge 31 operates to urge the lower kickstand plate to rotate to its deployed position as shown in FIGS. 2 and 9.

In the present example and with reference to FIGS. 1 and 8, an upper outer panel 38 is affixed to the upper portion of the flexible substrate 33 overlying the upper kickstand plate 30. Similarly, a lower outer panel 40 is affixed to a lower portion of the flexible substrate 33 overlying the lower kickstand plate 32.

As noted above, the upper kickstand plate 30 is slidably connected to the backplate 20. More particularly, in this example the backplate 20 comprises a first slot 26 and a second slot 28 defined in the backplate, with the slots extending in a direction parallel to the axis of rotation 34, and parallel to one another and spaced apart in the y-axis direction.

With reference to FIGS. 5, 6, 7, and 9, the upper kickstand plate 30 comprises a first slider 44 that protrudes from the upper kickstand plate and is slidably received in the first slot 26 of the backplate 20. With reference also to FIG. 8, the upper kickstand plate 30 also comprises a second slider 46 that protrudes from the upper kickstand plate and is slidably received in the second slot 28 of the backplate 20. The first slider 44 and second slider 46 are spaced apart in the y-axis direction by the same distance as the first slot 26 and the second slot 28. Advantageously and as described further below, this configuration enables the upper kickstand plate 30 (and attached lower kickstand plate 32) to slide laterally in the x-axis direction relative to the backplate 20 and frame 14 of the portable computing device 12. Additionally, and in another potential advantage of the present disclosure, utilizing two spaced apart sliders and corresponding slots reduces the potential for the sliders to bind or jam within the slots as compared to configurations using a single slider and slot. In other examples, kickstand assemblies of the present disclosure can include three, four, or more pairs of sliders and corresponding slots as described herein.

In the present example the first slider 44 and second slider 46 are integrally fabricated with the upper kickstand plate 30, such as via additive manufacturing techniques. Advantageously, integrally fabricating the sliders with the upper kickstand plate 30 enables more precise dimensional tolerancing and greater accuracy in positioning the sliders on the upper kickstand plate to mate with the corresponding first slot 26 and second slot 28 in the backplate 20. In other examples, kickstand assemblies of the present disclosure utilize a first slider 44 and second slider 46 that are separate components affixed to the upper kickstand plate 30. For example, the first slider 44 and second slider 46 can be affixed to the upper kickstand plate 30 via pins extending through apertures in each end of each slider.

Figure 6:
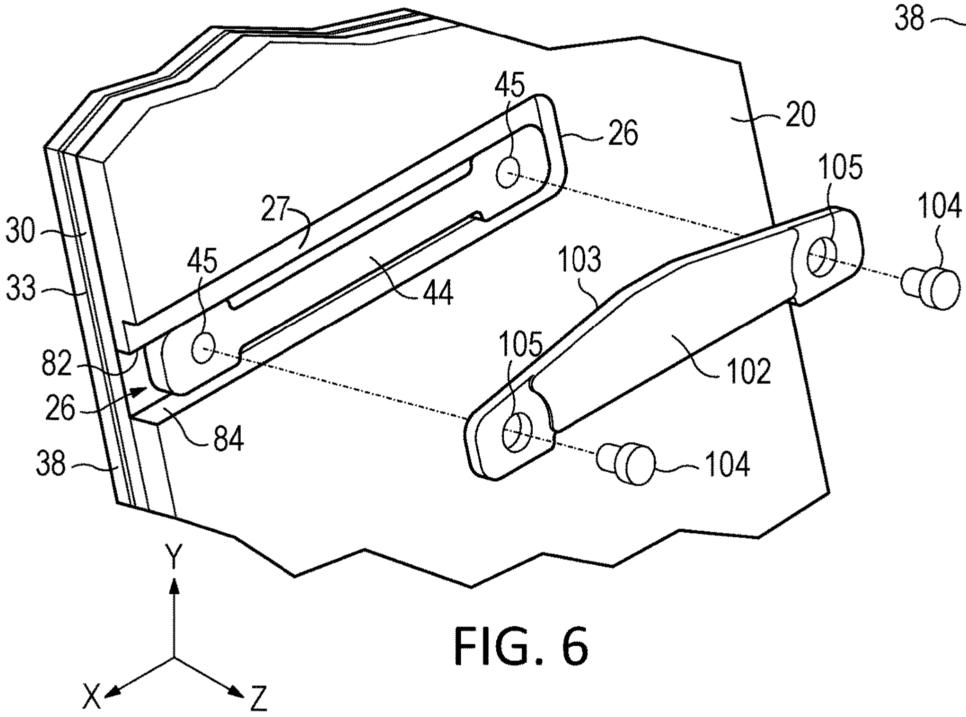
FIG. 6 shows an exploded partial view of a portion of the kickstand assembly of FIG. 1.
Figure 7:
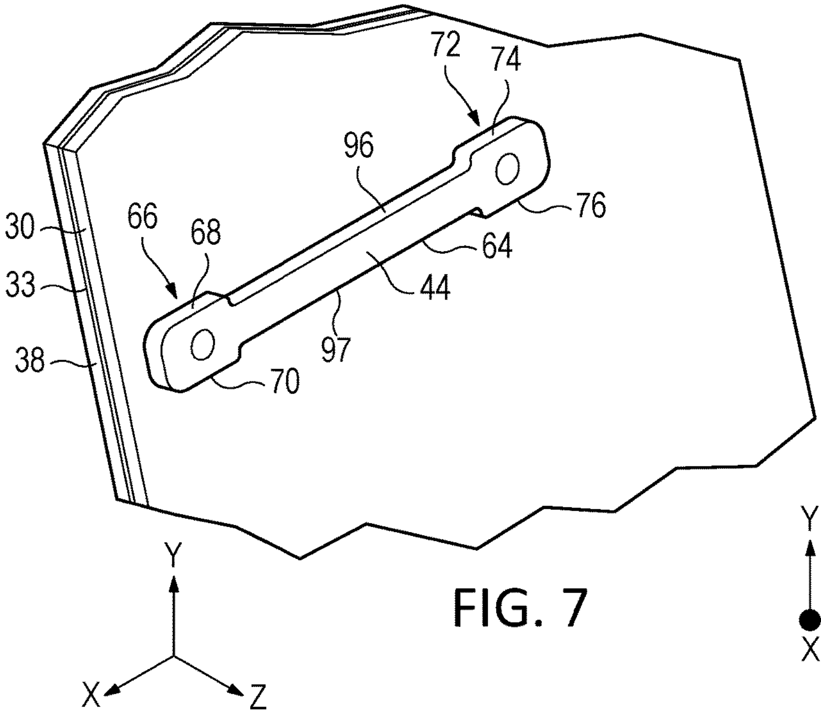
FIG. 7 shows a view of the slider and upper kickstand plate of the kickstand assembly of FIG. 6.

With reference now to FIGS. 6 and 7, an example structure of the first slider 44 is now provided. In the present example, the second slider 46 has the same shape and structure as the first slider 44. As shown in FIG. 7, the first slider 44 comprises an elongated member 64 that comprises a first end 66 comprising a first slider upper bearing surface 68 and a first slider lower bearing surface 70, and a second end 72 comprising a second slider upper bearing surface 74 and a second slider lower bearing surface 76. Between the first slider upper bearing surface 68 and the second slider upper bearing surface 74 is an upper recessed relief surface 96. Similarly, between the first slider lower bearing surface 70 and the second slider lower bearing surface 76 is a lower recessed relief surface 97. In one potential advantage of the present configuration and as described further below, by spacing the upper and lower bearing surfaces between elongated recessed relief surfaces, the first slider 44 (and second slider 46) embody spaced-apart slider surface areas that contact upper and lower slot surfaces at laterally separated locations within the slot. Advantageously, such spacings help reduce torsional forces exerted on the sliders when the upper kickstand plate 30 is translated, which correspondingly reduces the potential for the sliders to bind or jam within the slots.

In this example the first slider upper bearing surface 68 and the second slider upper bearing surface 74 are in sliding contact with a first slot upper bearing surface 82 of the first slot 26. In a similar manner, the first slider lower bearing surface 70 and the second slider lower bearing surface 76 are in sliding contact with a first slot lower bearing surface 84 of the first slot 26. Accordingly, and in one potential advantage of the present disclosure, this configuration constrains the first slider 44, second slider 46, and upper kickstand plate 30 to translate back and forth in the x-axis direction to enable the user to easily move the kickstand assembly, automatically deploy the lower kickstand plate 32 and allow the assembly to return to its rest position via return biasers (as described further below).

In other examples, the distance between the first slot upper bearing surface 82 and the first slot lower bearing surface 84 is slightly greater than the distance between the first slider upper bearing surface 68 and the first slider lower bearing surface 70, and similarly slightly greater than the distance between the second slider upper bearing surface 74 and the second slider lower bearing surface 76. In one potential advantage of these examples, the first slider 44 and second slider 46 have a slight freedom of movement in the y-axis direction to provide for lower frictional engagement and reduced possibilities of binding during movement in the x-axis direction.

In these and other examples, the first slot and second slot can extend in a direction at least substantially parallel to the axis of rotation 34, and at least substantially parallel to one another. Alternatively expressed, in these and other examples the first slot and second slot can extend in a direction that is slightly diverging from parallel to the axis of rotation 34, and slightly diverging from parallel to one another, while still enabling movement of the sliders within the slots.

To retain the first slider 44 within the first slot 26, a first capture member 102 is affixed to the first slider 44. In this example, pins 104 extend through apertures 105 in the capture member 102 and into apertures 45 in the first slider 44 to retain the first slider within the first slot 26. With reference to FIGS. 6 and 8, a rear face 103 of the first capture member 102 rests against a first shelf 27 within the first slot 26. Advantageously, in this configuration the first capture member 102 retains the first slider 44 within the first slot 26, which correspondingly retains and enables the kickstand assembly 10 to translate laterally with respect to the backplate 20.

Figure 5:
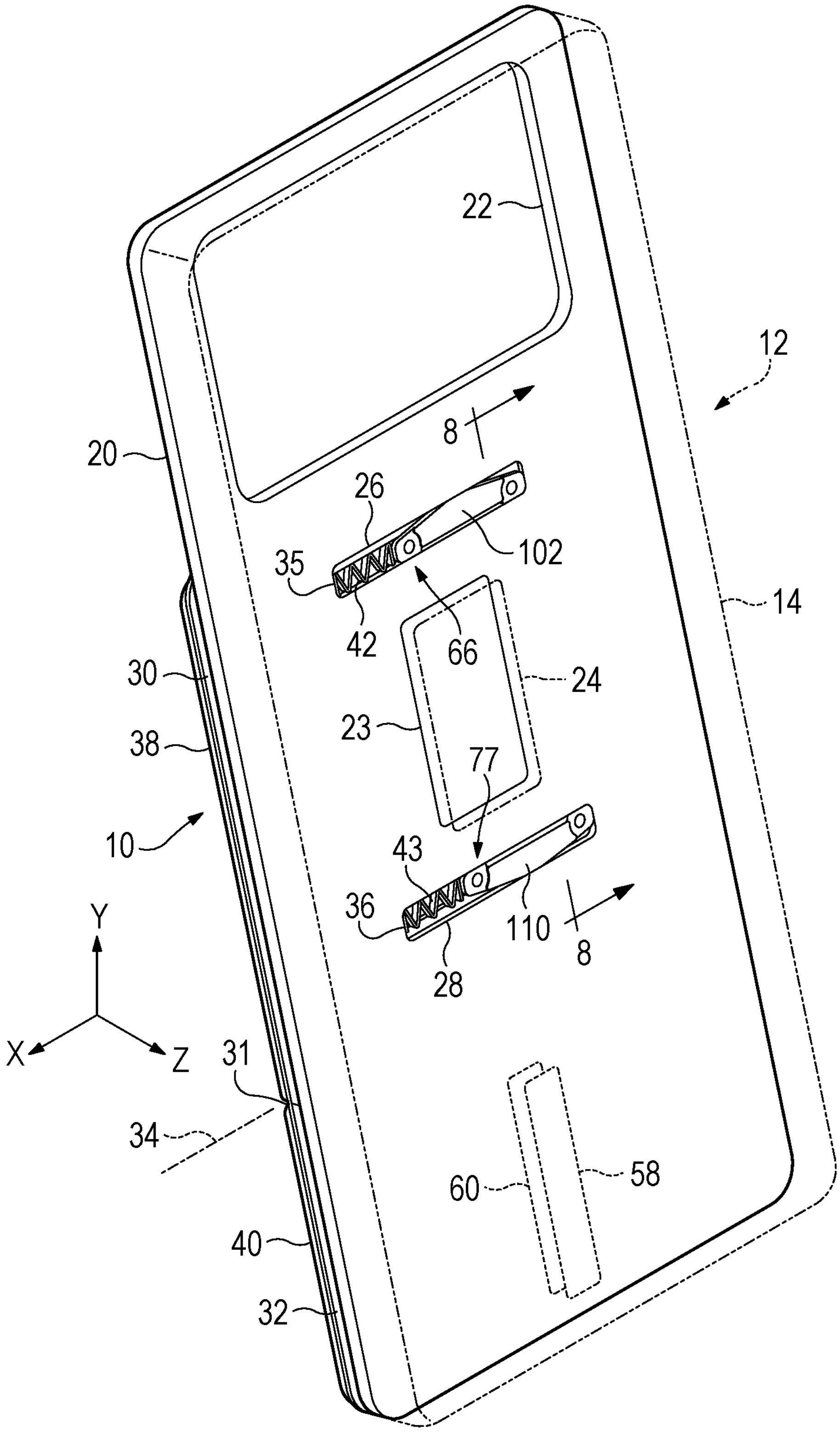
FIG. 5 shows another view of the kickstand assembly of FIG. 1.

With reference to FIGS. 5, 8, and 9, the second slider 46 is similarly retained within the second slot 28 by a second capture member 110 via pins 104. A rear face 112 of the second capture member 110 rests against a second shelf 29 within the second slot 28. As described above, the second capture member 110 retains the second slider 46 within the second slot 28, which correspondingly retains and enables the kickstand assembly 10 to translate laterally with respect to the backplate 20.

As noted above, and in another potential advantage of the present disclosure, magnets are operable to releasably retain the lower kickstand plate 32 against the backplate 20 when the kickstand assembly is in the rest position (shown in FIGS. 1 and 5), and enable the lower kickstand plate to automatically deploy when a user laterally slides the assembly from the rest position to a mid-deployed position (shown in FIGS. 2 and 9). More particularly and with reference to FIGS. 5 and 9, in this example the backplate 20 includes a backplate retention magnet 58 that has a first magnetic pole orientation. The lower kickstand plate 32 includes a closing magnet 60 having a second magnetic pole orientation that attracts the first magnetic pole orientation of the backplate retention magnet.

Accordingly, as shown in FIG. 5 and in another potential advantage of the present disclosure, the closing magnet 60 of the lower kickstand plate 32 overlies and magnetically attracts the backplate retention magnet 58 in the backplate 20 to releasably secure the lower kickstand plate to the backplate when the lower kickstand plate is in the rest position relative to the backplate. In this example, the magnitude of the attractive force between the backplate retention magnet 58 and the closing magnet 60 is greater than the opposing force generated by the pre-loaded living hinge 31 that biases the lower kickstand plate 32 to rotate away from the backplate 20.

In this example, the rest position is a non-deployed rest position that corresponds to the configuration of the kickstand assembly 10 in FIGS. 1 and 5, with the lower kickstand plate 32 parallel with the upper kickstand plate 30 (i.e., not deployed). Advantageously, this configuration holds the lower kickstand plate 32 flush with the backplate surface. Additionally and in some examples, while in this rest position the lower kickstand plate 32 can be manually deployed by a user grasping and pulling the lower kickstand plate outwardly to overcome the magnetic attractions between the closing magnet 60 and the backplate retention magnet 58.

As noted above, the pre-loaded living hinge 31 urges the lower kickstand plate 32 to rotate away from the backplate

20. In this manner, when the upper kickstand plate 30 is laterally translated in the positive x-axis direction relative to the backplate 20 from the rest position toward the deployed position of FIGS. 2 and 9, the closing magnet 60 is translated away from overlying the backplate retention magnet 58 to lessen the attractive force between the magnets, whereby the pre-loaded living hinge 31 causes the lower kickstand plate 32 to rotate about the upper kickstand plate into the angled, mid-deployed position as shown in FIGS. 2 and 9. Accordingly, and in another potential advantage of the present disclosure, this configuration easily and conveniently deploys the lower kickstand plate 32 when the upper kickstand plate 30 is laterally translated away from the rest position in the positive x-axis direction.

Additionally in another potential advantage and as referenced above, configurations of the present disclosure include one or more return biasers that bias the upper kickstand plate 30 back into the rest position when a user releases the assembly after deploying the lower kickstand plate 32. Advantageously, in this manner the kickstand assembly 10 enables a user to easily and conveniently deploy the lower kickstand plate 32 and ready the portable computing device 10 for placement on a surface by simply laterally sliding the upper kickstand plate 30 relative to the underlying backplate 20 and then allowing the return biasers to return the upper kickstand plate to its rest position.

In the present example and with reference to FIGS. 5 and 9, a first return biaser in the form of a first compression spring 42 is provided in the first slot 26. In this example, the first compression spring 42 extends between an end wall 35 of the first slot 26 and the first end 66 of the first slider 44. Similarly, a second return biaser in the form of a second compression spring 43 is provided in the second slot 28. In this example, the second compression spring 43 extends between an end wall 36 of the second slot 28 and the first end 77 of the second slider 46. In this example, both first compression spring 42 and second compression spring 43 bias the upper kickstand plate 30 to remain in the rest position of FIG. 4.

Figure 3:
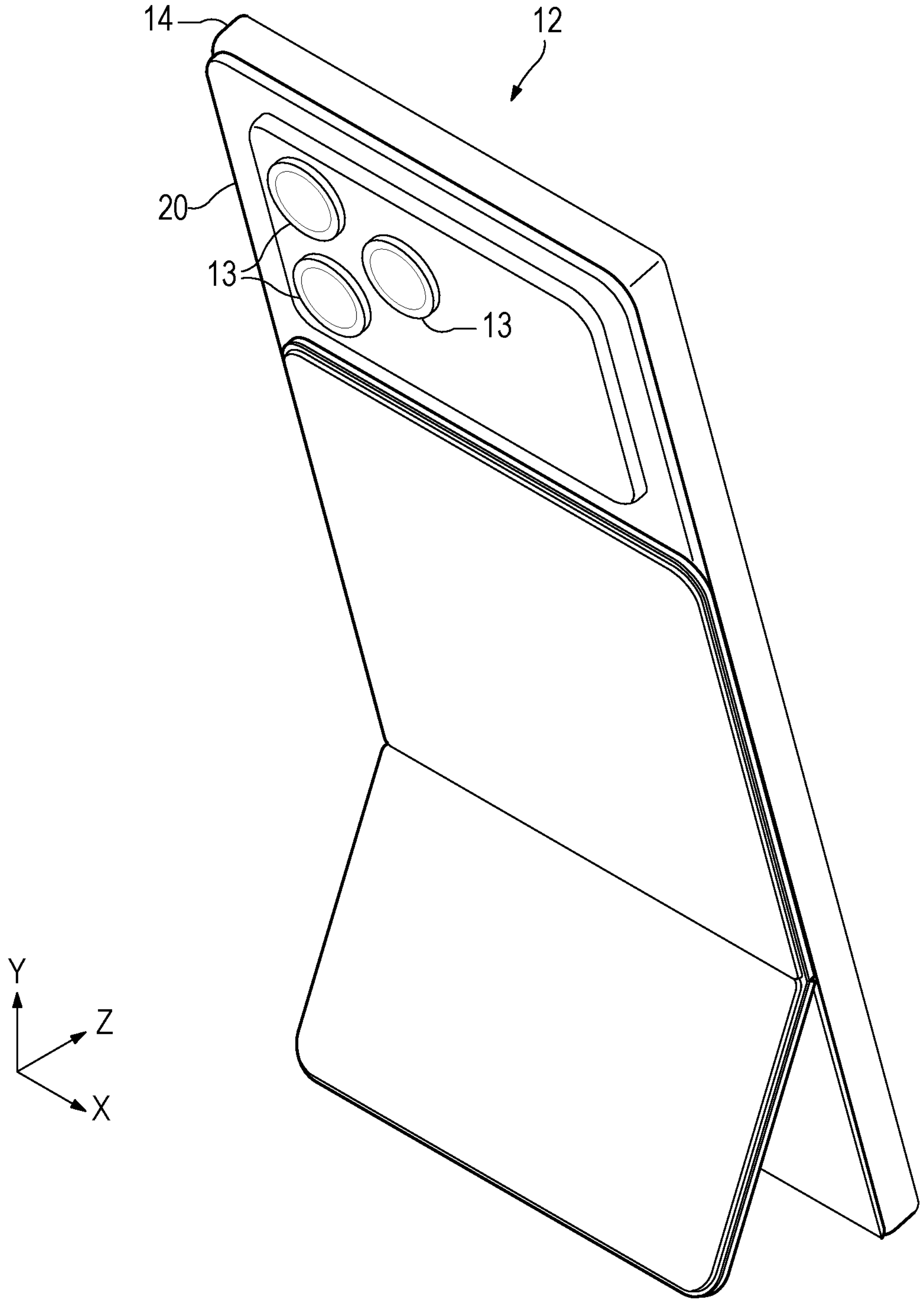
FIG. 3 shows another example of a kickstand assembly integrated into a frame of a portable computing device according to examples of the present disclosure.
Figure 4:
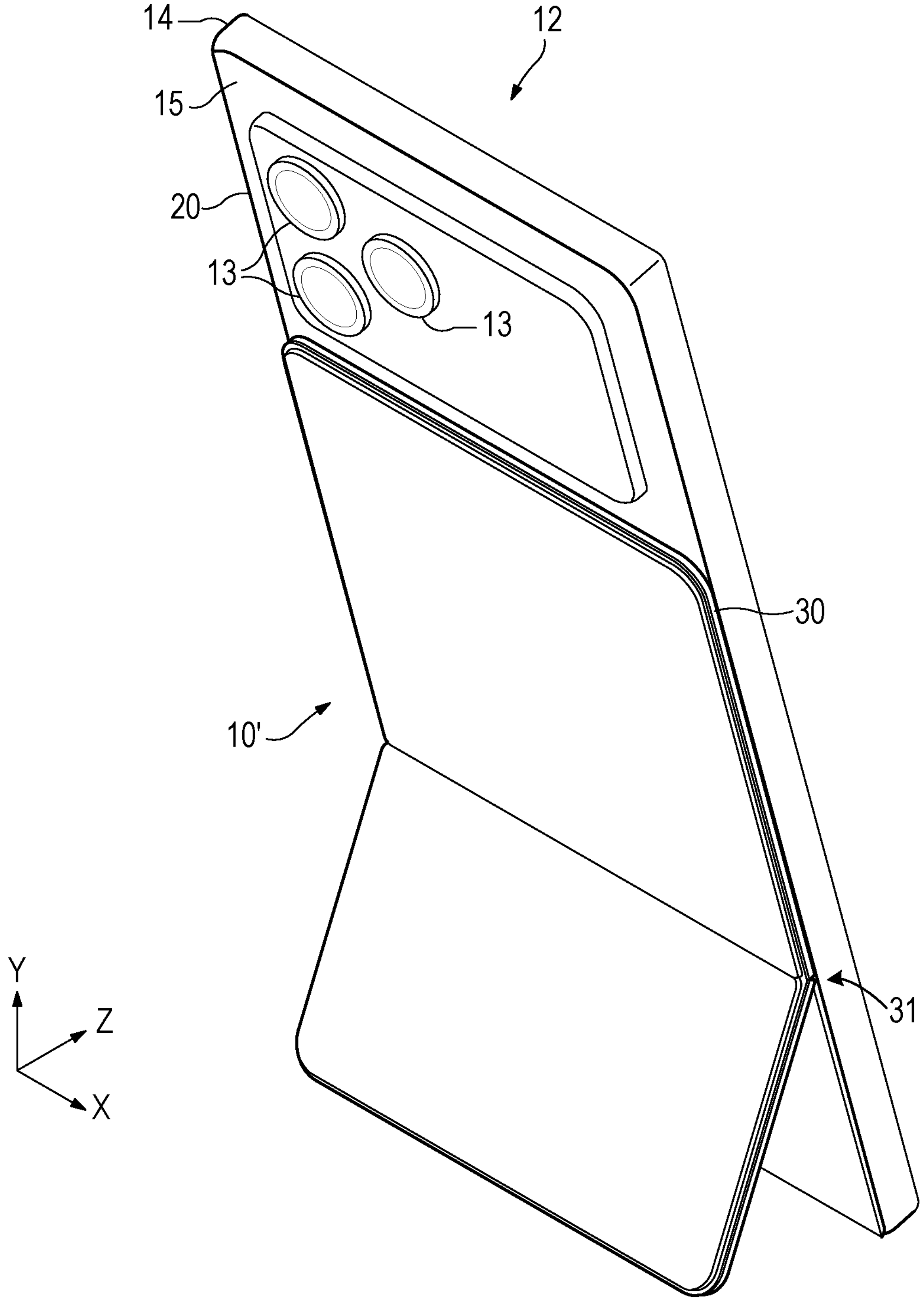
FIG. 4 shows another view of the kickstand assembly of FIG. 1 in a deployed and rest position.

As shown in FIG. 9, when the upper kickstand plate 30 is translated in the x-axis direction, the lower kickstand plate 32 is deployed, and the first compression spring 42 and second compression spring 43 are compressed. In another potential advantage of the present disclosure, when the user releases the upper kickstand plate 30, the first compression spring 42 and second compression spring 43 expand to translate the upper kickstand plate (and deployed lower kickstand plate 32) back into the rest position as shown in FIG. 3. It follows that this configuration both automatically deploys the lower kickstand plate 32 and returns the upper kickstand plate 30 to the rest position, thereby providing a stable and secure angled positioning of the portable computing device 12.

Figure 10:
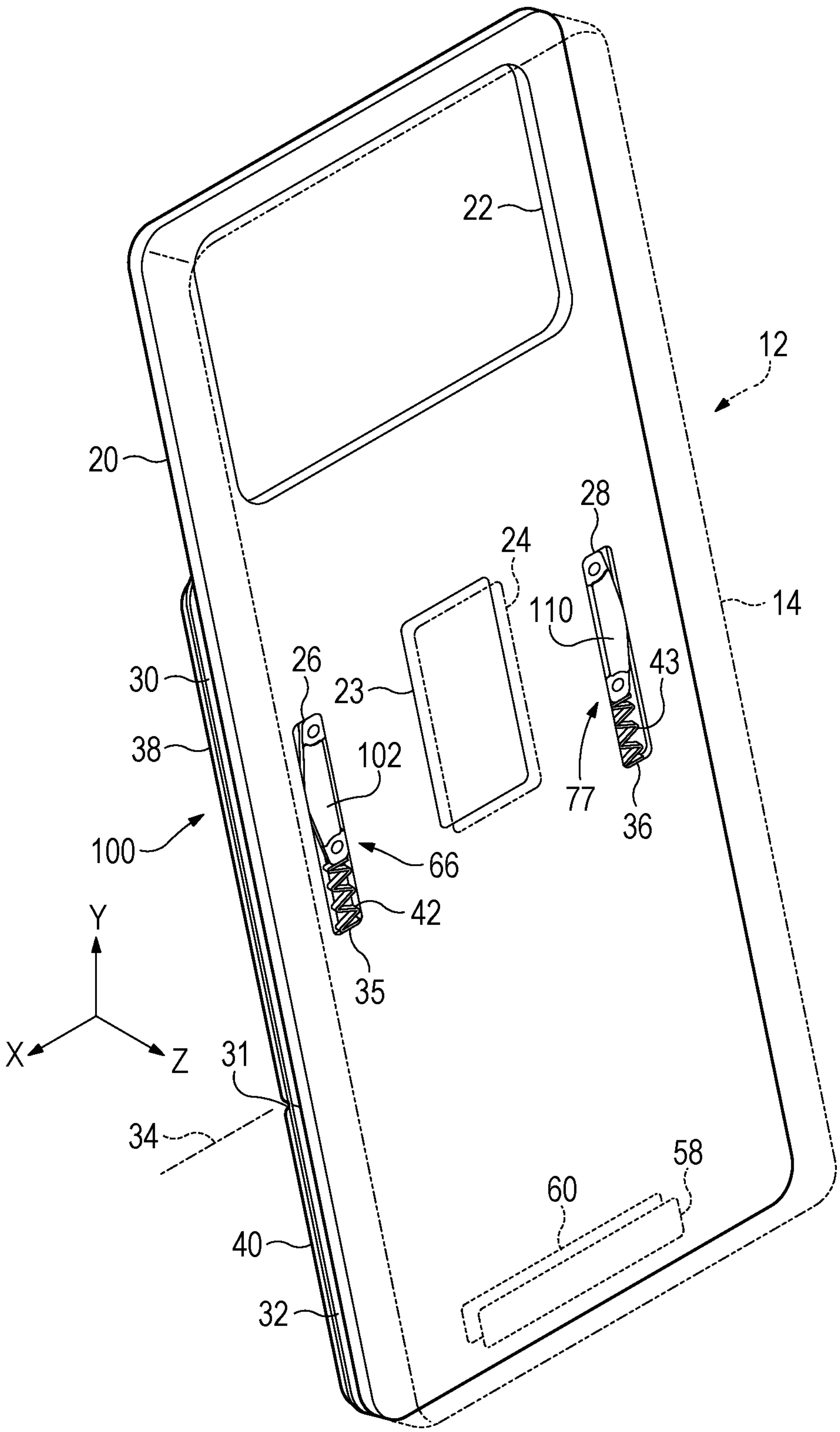
FIG. 10 shows another example of a kickstand assembly mounted to a portable computing device according to examples of the present disclosure.
Figure 11:
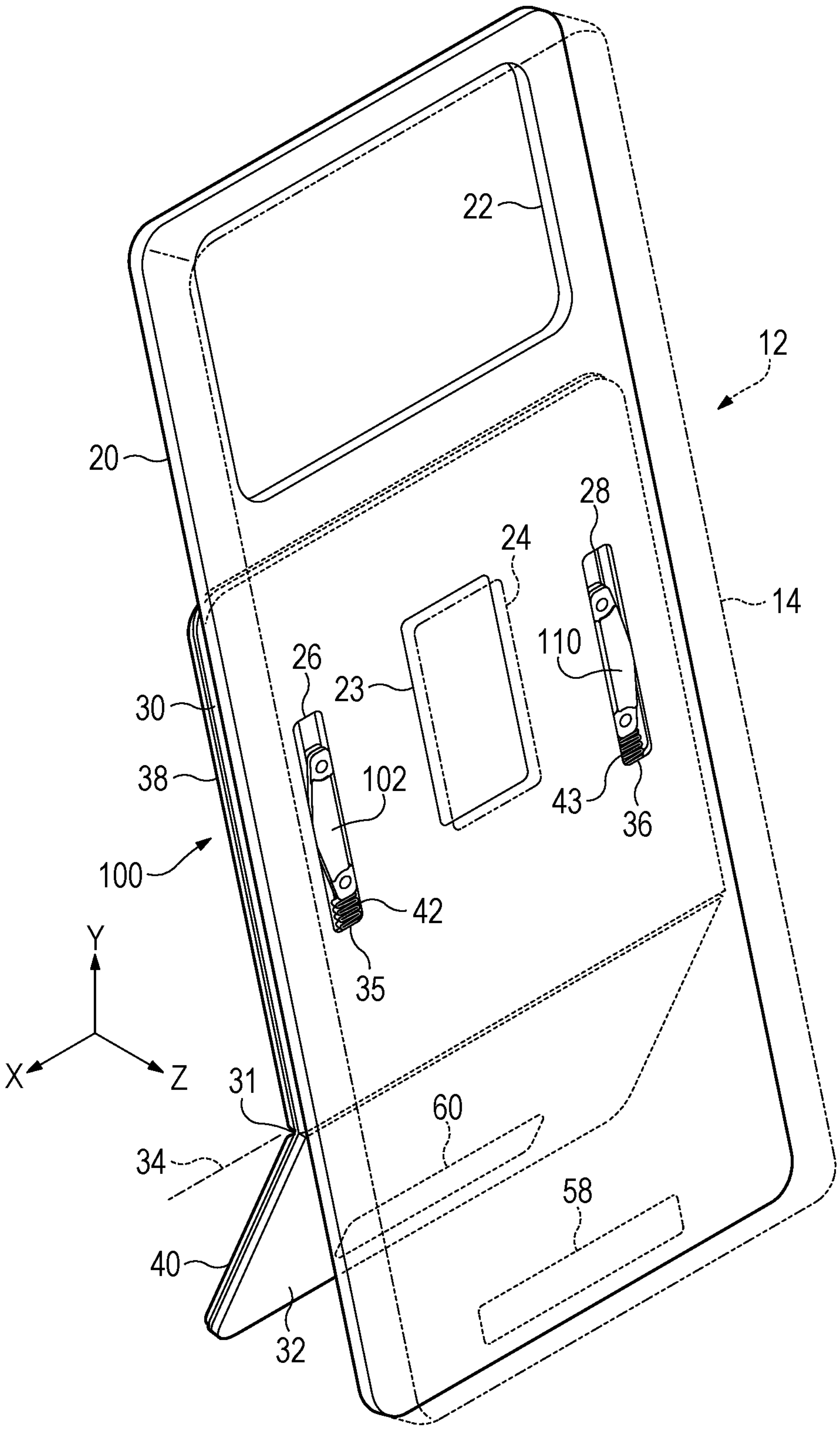
FIG. 11 shows the kickstand assembly of FIG. 10 in a deployed position.

Further and in some examples, configurations of the present disclosure can enable one-handed operation by a user, whereby a user can hold with one hand the portable computing device 12 in the non-deployed rest position (as seen in FIG. 1) and utilize the same hand to translate the upper kickstand plate 30 and deploy the lower kickstand plate 32. With reference now to FIGS. 10 and 11, in another example of the present disclosure, a kickstand assembly 100 includes slots and corresponding sliders and springs as described above, except in this example the slots are vertically oriented relative to the longitudinal (long) axis of the computing device 12.

More particularly, in this example the backplate 20 comprises first slot 26 and second slot 28 that extend in a direction perpendicular to the axis of rotation 34 of the lower kickstand plate 32 and are parallel to one another and spaced apart in the x-axis direction. Like the example described above and shown in FIGS. 5-9, in this example the upper kickstand plate 30 comprises first slider 44 (covered by first capture member 102) that protrudes from the upper kickstand plate and is slidably received in the first slot 26 of the backplate 20. The upper kickstand plate 30 also comprises second slider 46 (covered by second capture member 110) that protrudes from the upper kickstand plate and is slidably received in the second slot 28 of the backplate 20. First compression spring 42 is provided in the first slot 26, and second compression spring 43 is provided in the second slot 28. First slot 26, second slot 28, first slider 44, second slider 46, first compression spring 42, and second compression spring 43 utilize the same structure and interrelationship as described above. In other examples, kickstand assemblies of this configuration can include three, four, or more pairs of sliders and corresponding slots as described herein.

Advantageously, this configuration enables the upper kickstand plate 30 (and attached lower kickstand plate 32) to slide longitudinally in the y-axis direction relative to the backplate 20 and frame 14 of the portable computing device 12. As described further below, in some examples this configuration can enable a user to easily deploy the lower kickstand plate 32 by holding the portable computing device 12 and translating the upper kickstand plate 30 with one hand in the negative y-axis direction.

More particularly and with reference to FIG. 10, in this configuration the closing magnet 60 of the lower kickstand plate 32 overlies and magnetically attracts the backplate retention magnet 58 in the backplate 20 to releasably secure the lower kickstand plate to the backplate when the lower kickstand plate is in the rest position relative to the backplate. Advantageously, this configuration holds the lower kickstand plate 32 flush with the backplate surface.

As described above, the pre-loaded living hinge 31 urges the lower kickstand plate 32 to rotate away from the backplate 20. In this manner and as shown in FIG. 11, when the upper kickstand plate 30 is translated downwardly in the negative y-axis direction relative to the backplate 20 from the rest position, the closing magnet 60 is translated away from overlying the backplate retention magnet 58 to lessen the attractive force between the magnets, whereby the pre-loaded living hinge 31 causes the lower kickstand plate 32 to rotate about the upper kickstand plate into the angled, deployed position as shown in FIG. 11. Accordingly, and in another potential advantage of the present disclosure, this configuration easily and conveniently deploys the lower kickstand plate 32 when the upper kickstand plate 30 is longitudinally translated away from the rest position in the negative y-axis direction.

Additionally, this configuration can enable a user to easily deploy the lower kickstand plate 32 with one hand. For example, a user may hold the portable computing device 12 in one hand, such as using a thumb and one or more fingers to grasp the frame 14, and translate the upper kickstand plate 30 to release the lower kickstand plate using the index finger of that hand. Advantageously, such one-handed operation frees the other hand of the user for other activities.

Additionally, and similar to the other example described above, when the user releases the upper kickstand plate 30, the first compression spring 42 and second compression spring 43 expand to translate the upper kickstand plate and deployed lower kickstand plate 32 in the positive y-axis direction back into the rest position shown. It follows that this configuration both automatically deploys the lower kickstand plate 32 and returns the upper kickstand plate 30 to the rest position, thereby providing a stable and secure angled positioning of the portable computing device 12.

Additionally, and similar to other example described above, in some examples the first slider 44 and second slider 46 have a slight freedom of movement in the x-axis direction to provide for lower frictional engagement and reduced possibilities of binding during movement in the y-axis direction. In these and other examples, the first slot and second slot can extend in a direction at least substantially perpendicular to the axis of rotation 34, and at least substantially parallel to one another. Alternatively expressed, in these and other examples the first slot and second slot can extend in a direction that is slightly diverging from perpendicular to the axis of rotation 34, and slightly diverging from parallel to one another, while still enabling movement of the sliders within the slots.

In other examples, kickstand assemblies of the present disclosure utilize slots in the upper kickstand plate and sliders protruding from the backplate. With reference now to FIGS. 12-16, in one example a kickstand assembly 200 comprises a backplate 220 that includes a first slider 244 and a second slider 246 protruding from the backplate. The first slider 244 is slidably received in a first slot 226 located in the upper kickstand plate 230. Similarly, the second slider 246 is slidably received in a second slot 228 located in the upper kickstand plate 230. The first slider 244 and second slider 246 are spaced apart in the y-axis direction by the same distance as the first slot 226 and the second slot 228. Advantageously and like the configuration described in FIGS. 1-9, this configuration enables the upper kickstand plate 230 and lower kickstand plate 232 to slide laterally in the x-axis direction relative to the backplate 220 and frame 14 of the portable computing device 12. In other examples of this configuration, kickstand assemblies of the present disclosure can include three, four, or more pairs of sliders and corresponding slots as described herein.

In the present example the first slider 244 and second slider 246 are integrally fabricated with the backplate 220, such as via additive manufacturing techniques. Advantageously and as noted above, integrally fabricating the sliders with the backplate 220 enables more precise dimensional tolerances and greater accuracy in positioning the sliders on the backplate to mate with the corresponding first slot 226 and second slot 228 in the upper kickstand plate 230. In other examples, kickstand assemblies of the present disclosure utilize a first slider 244 and second slider 246 that are separate components affixed to the backplate 220.

In this example, and in one potential advantage as described above, the backplate 220 is a separate structure that is removably attached to the portable computing device 12. More particularly, in this example and with reference to FIGS. 12 and 13, the backplate 220 comprises a backplate accessory magnet 223 that is configured to attract a corresponding frame accessory magnet 224 located in the frame 14 of the portable computing device 12. Advantageously, this configuration allows a user to conveniently and easily attach or detach the kickstand assembly 200 from the portable computing device 12.

In other examples, the backplate accessory magnet 223 can be positioned in a variety of other locations in the backplate 220 to correspond with a location of a corresponding frame accessory magnet 224 in a frame of the portable computing device. Additionally or alternatively, other examples of kickstand assemblies of the present disclosure can include one or more additional backplate accessory magnet(s) that are located and configured to attract one or more additional corresponding frame accessory magnet(s) in a frame of a portable computing device. In other examples of this configuration and as described above, kickstand assemblies of the present disclosure are integrated a frame of the portable computing device (i.e., not removable).

Like the examples described above, the upper kickstand plate 230 and lower kickstand plate 232 are rotatably coupled via a living hinge 231 that is pre-loaded to bias the lower kickstand plate to rotate away from the backplate 220. In this manner, the living hinge 231 comprises a deployment biaser that biases the lower kickstand plate 232 away from the backplate 220. In other examples, the deployment biaser can additionally or alternatively include a leaf spring, elastomeric member, or any other suitable biaser element that biases the lower kickstand plate 232 to rotate away from the backplate 220.

In this example the living hinge 231 comprises a flexible substrate 233, such as a polyester film, to which the upper kickstand plate 230 and lower kickstand plate 232 are affixed, such as via an adhesive. An upper outer panel 238 is affixed to the upper portion of the flexible substrate 233 overlying the upper kickstand plate 230. Similarly, a lower outer panel 240 is affixed to a lower portion of the flexible substrate 233 overlying the lower kickstand plate 232. In other examples, a variety of other materials and structures can be utilized to rotatably couple the upper kickstand plate 230 to the lower kickstand plate 232. Advantageously, in this configuration, when the upper kickstand plate 230 is laterally translated in the positive x-axis direction relative to the backplate 220, pre-loaded living hinge 231 operates to urge the lower kickstand plate to rotate to its deployed position as shown in FIG. 13.

Figure 13:
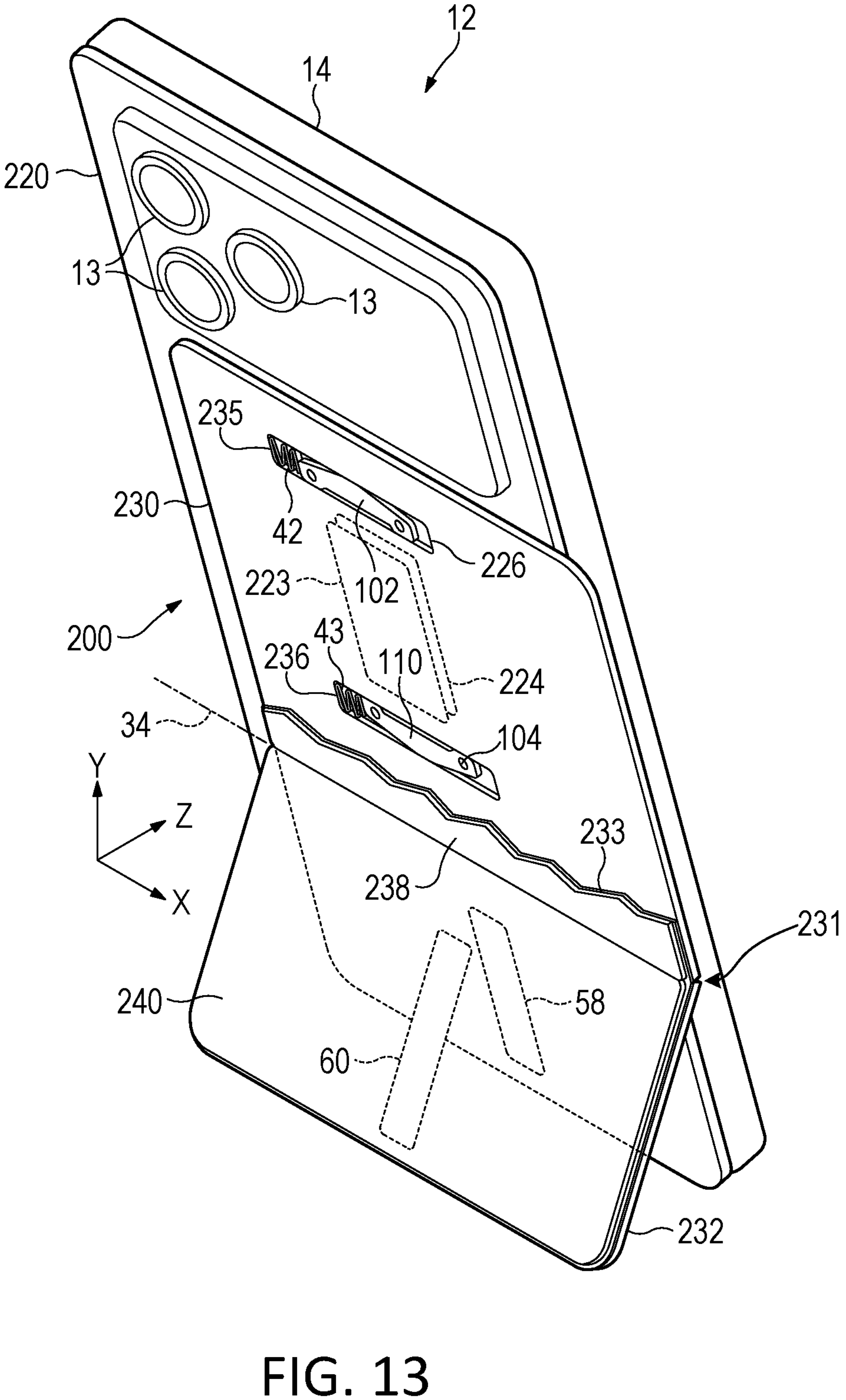
FIG. 13 shows the kickstand assembly of FIG. 12 in a mid-deployed position.

With continued reference to FIG. 13, when the upper kickstand plate 230 is translated in the x-axis direction, the lower kickstand plate 232 is deployed, and the first compression spring 42 and second compression spring 43 are compressed. In another potential advantage of the present disclosure, when the user releases the upper kickstand plate 230, the first compression spring 42 and second compression spring 43 expand to translate the upper kickstand plate (and deployed lower kickstand plate 232) back into the rest position. It follows that this configuration both automatically deploys the lower kickstand plate 232 and returns the upper kickstand plate 230 to the rest position, thereby providing a stable and secure angled positioning of the portable computing device 12.

Figure 14:
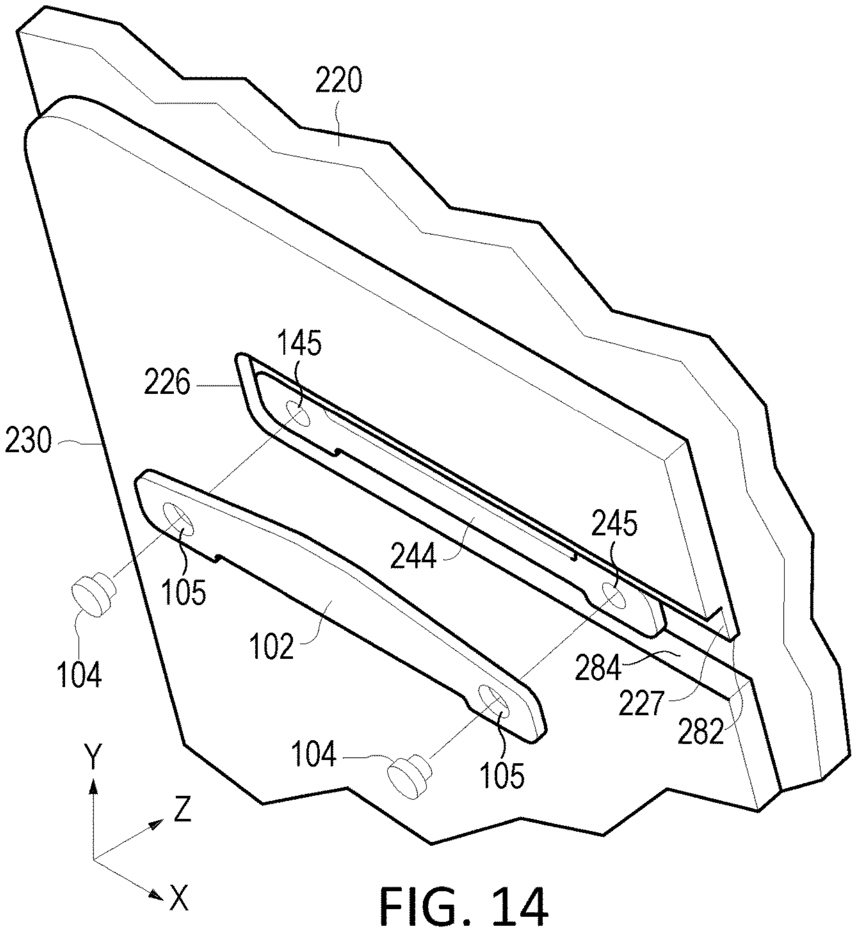
FIG. 14 shows an exploded partial view of a portion of the kickstand assembly of FIG. 10.
Figure 16:
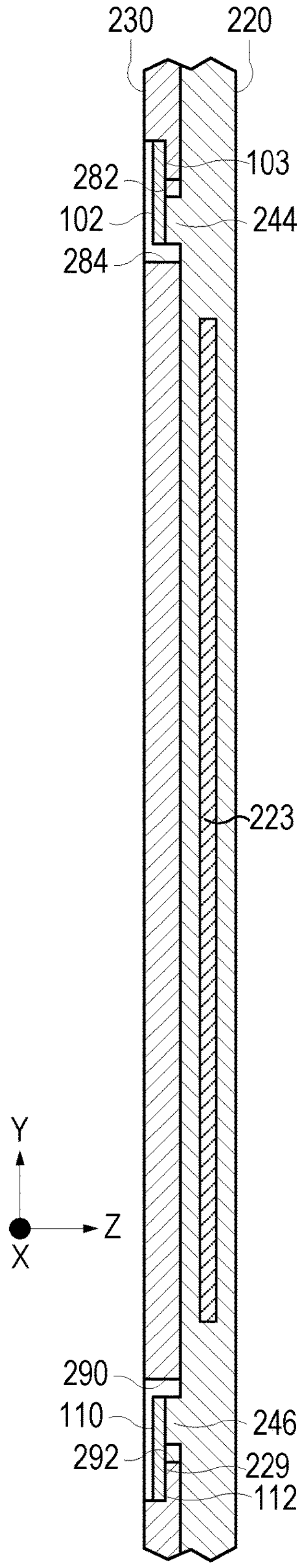
FIG. 16 shows a cross-section view taken along lines 16-16 in FIG. 12.
Figure 15:
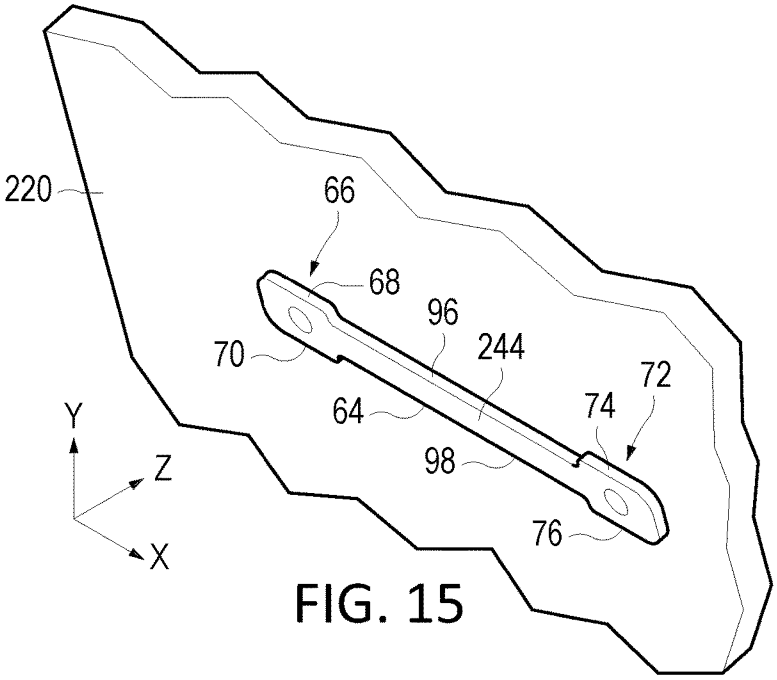
FIG. 15 shows a view of the slider and backplate of the kickstand assembly of FIG. 14.

With reference now to FIGS. 14-16, an example structure of the first slider 244 is now provided. In the present example, the first slider 244 has the same shape and structure as the first slider 44 described above. Accordingly, reference numerals denoting the same structures are utilized. Additionally, the second slider 246 has the same shape and structure as the first slider 244.

As shown in FIG. 15, the first slider 244 comprises an elongated member 64 that comprises a first end 66 comprising a first slider upper bearing surface 68 and a first slider lower bearing surface 70, and a second end 72 comprising a second slider upper bearing surface 74 and a second slider lower bearing surface 76. Between the first slider upper bearing surface 68 and the second slider upper bearing surface 74 is an upper recessed relief surface 96. Similarly, between the first slider lower bearing surface 70 and the second slider lower bearing surface 76 is a lower recessed relief surface 97. As noted above, by spacing the upper and lower bearing surfaces between elongated recessed relief surfaces, the first slider 244 (and second slider 246) create distanced slider surface areas that contact upper and lower slot surfaces at spaced-apart locations within the slot. Advantageously, such spacings help reduce torsional forces exerted on the sliders which correspondingly reduces the potential for the sliders to bind or jam within the slots.

As best seen in FIGS. 14-16, in this example the first slider upper bearing surface 68 and the second slider upper bearing surface 74 are in sliding contact with a first slot upper bearing surface 282 of the first slot 226. In a similar manner, the first slider lower bearing surface 70 and the second slider lower bearing surface 76 are in sliding contact with a first slot lower bearing surface 284 of the first slot 226. Accordingly and like the example described above, the upper kickstand plate 230 is constrained to translate in the x-axis direction to enable the user to easily move the kickstand assembly 200 and automatically deploy the lower kickstand plate 232 as described herein.

In other examples, the distance between the first slot upper bearing surface 282 and the first slot lower bearing surface 284 is slightly greater than the distance between the first slider upper bearing surface 68 and the first slider lower bearing surface 70, and similarly slightly greater than the distance between the second slider upper bearing surface 74 and the second slider lower bearing surface 76. In one potential advantage of these examples, the first slider 244 and second slider 246 have a slight freedom of movement in the y-axis direction to provide for reduced frictional engagement and a lower likelihood of binding in the x-axis direction.

To retain the first slider 244 within the first slot 226, a first capture member 102 is affixed to the first slider 244. In this example, pins 104 extend through apertures 105 in the first capture member 102 and into apertures 45 in the first slider 244 to retain the first slider within the first slot 226. With reference to FIGS. 14 and 16, a rear face 103 of the first capture member 102 rests against a first shelf 227 within the first slot 226. Advantageously, in this configuration the first capture member 102 retains the first slider 244 within the first slot 226, which correspondingly retains and enables the kickstand assembly 200 to translate laterally with respect to the backplate 20.

Figure 12:
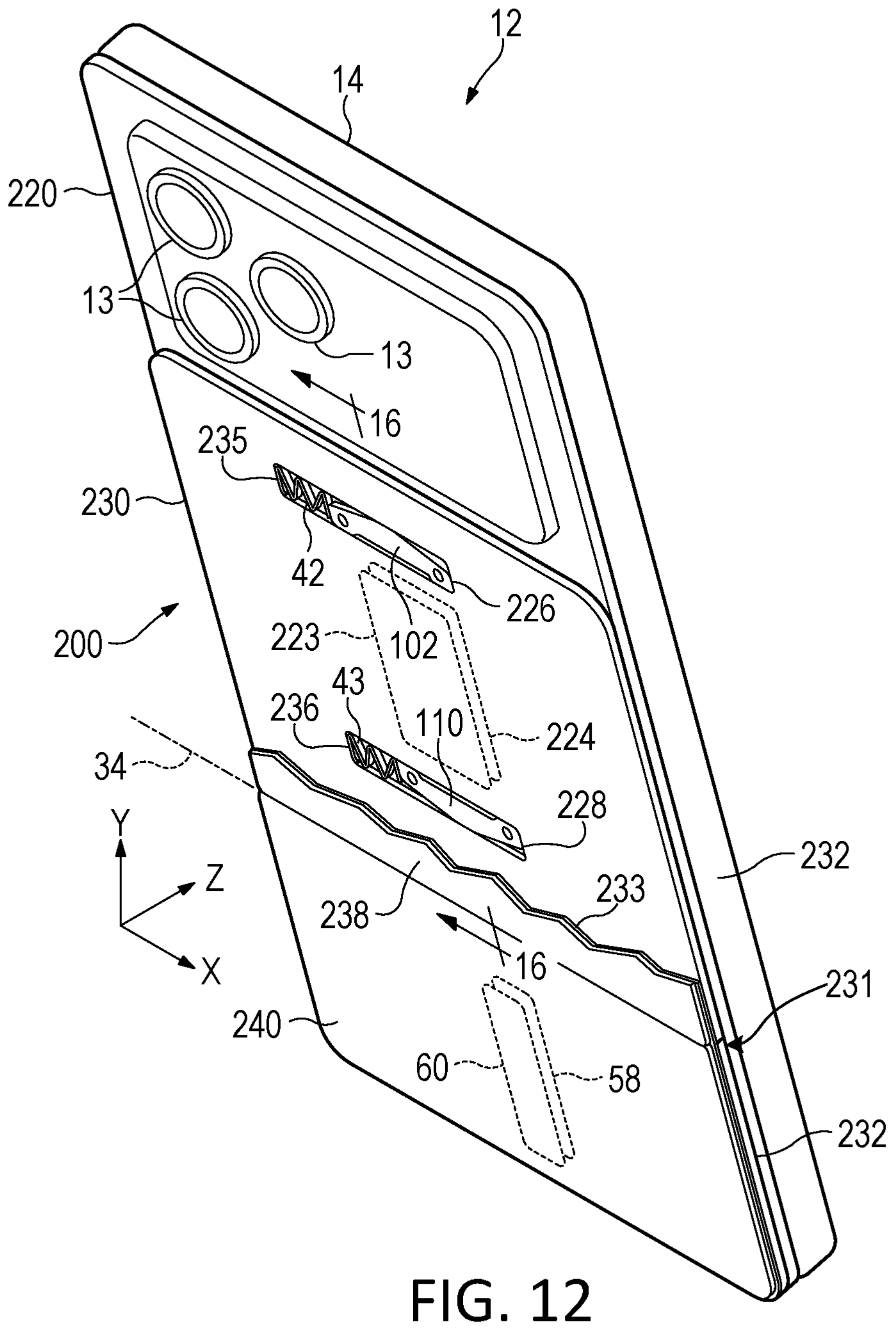
FIG. 12 shows a partial view of the kickstand assembly of FIG. 10.

With reference to FIGS. 12, 13, and 16, the second slider 246 is similarly retained within the second slot 228 by a second capture member 110 via pins 104. A rear face 112 of the second capture member 110 rests against a second shelf 229 within the second slot 228. As described above, the second capture member 110 retains the second slider 246 within the second slot 228, which correspondingly retains and enables the kickstand assembly 200 to translate laterally with respect to the backplate 20.

As with the other examples described above, and in another potential advantage of the present disclosure, magnets are operable to releasably retain the lower kickstand plate 232 against the backplate 220 when the kickstand assembly is in the rest position, and to enable the lower kickstand plate to automatically deploy when a user laterally slides the assembly from the rest position to a mid-deployed position (shown in FIG. 13). In this example the backplate 220 includes backplate retention magnet 58 that has a first magnetic pole orientation. The lower kickstand plate 232 includes closing magnet 60 having a second magnetic pole orientation that attracts the first magnetic pole orientation of the backplate retention magnet.

Accordingly, as shown in FIG. 12 and in another potential advantage of the present disclosure, the closing magnet 60 of the lower kickstand plate 232 overlies and magnetically attracts the backplate retention magnet 58 in the backplate 220 to releasably secure the lower kickstand plate to the backplate when the lower kickstand plate is in the rest position relative to the backplate. In this example, the magnitude of the attractive force between the backplate retention magnet 58 and the closing magnet 60 is greater than the opposing force generated by the pre-loaded living hinge 231 that biases the lower kickstand plate 232 to rotate away from the backplate 220.

As noted above, the pre-loaded living hinge 231 urges the lower kickstand plate 232 to rotate away from the backplate 20. In this manner, when the upper kickstand plate 230 is laterally translated in the positive x-axis direction relative to the backplate 220 from the rest position toward the deployed position of FIG. 13, the closing magnet 60 is translated away from overlying the backplate retention magnet 58 to lessen the attractive force between the magnets, whereby the pre-loaded living hinge 231 causes the lower kickstand plate 232 to rotate about the upper kickstand plate into the angled, deployed position as shown in FIG. 13. Accordingly, and in a potential advantage of the present disclosure, this configuration easily and conveniently deploys the lower kickstand plate 232 when the upper kickstand plate 230 is laterally translated away from the rest position in the positive x-axis direction.

Additionally, in another potential advantage and like the examples above, this configuration includes first compression spring 42 provided in the first slot 226. In this example, the first compression spring 42 extends between an end wall 235 of the first slot 226 and the first end 66 of the first slider 244. Similarly, second compression spring 43 is provided in the second slot 228. In this example, the second compression spring 43 extends between an end wall 236 of the second slot 228 and the first end 77 of the second slider 46. In this example, both first compression spring 42 and second compression spring 43 bias the upper kickstand plate 230 to remain in the rest position of FIG. 12.

As shown in FIG. 13, when the upper kickstand plate 230 is translated in the x-axis direction, the lower kickstand plate 232 is deployed, and the first compression spring 42 and second compression spring 43 are compressed. In another potential advantage of the present disclosure, when the user releases the upper kickstand plate 230, the first compression spring 42 and second compression spring 43 expand to translate the upper kickstand plate (and deployed lower kickstand plate 232) back into the rest position as shown in FIG. 12. It follows that this configuration both automatically deploys the lower kickstand plate 232 and returns the upper kickstand plate 230 to the rest position, thereby providing a stable and secure angled positioning of the portable computing device 12.

Figure 17:
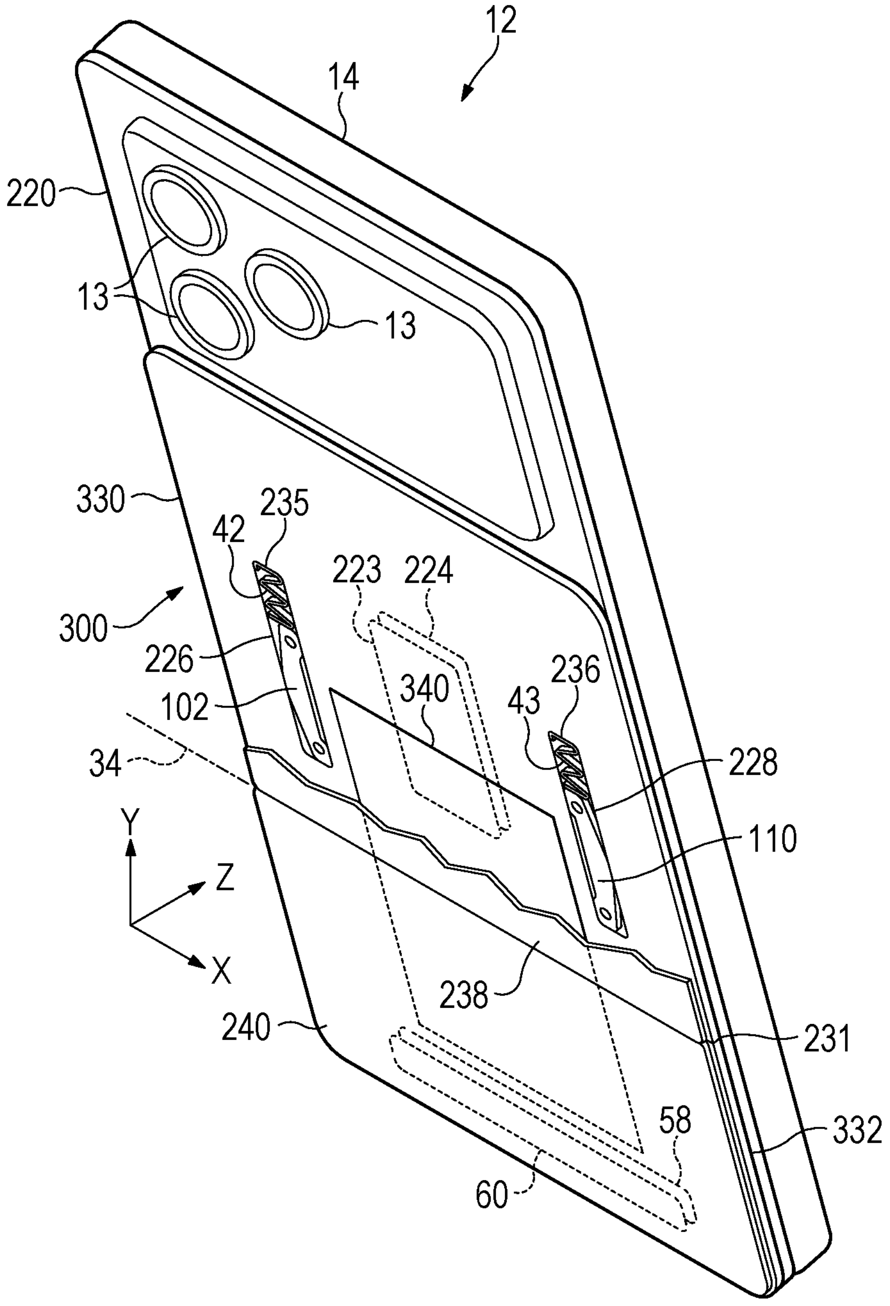
FIG. 17 shows another example of a kickstand assembly according to examples of the present disclosure.
Figure 18:
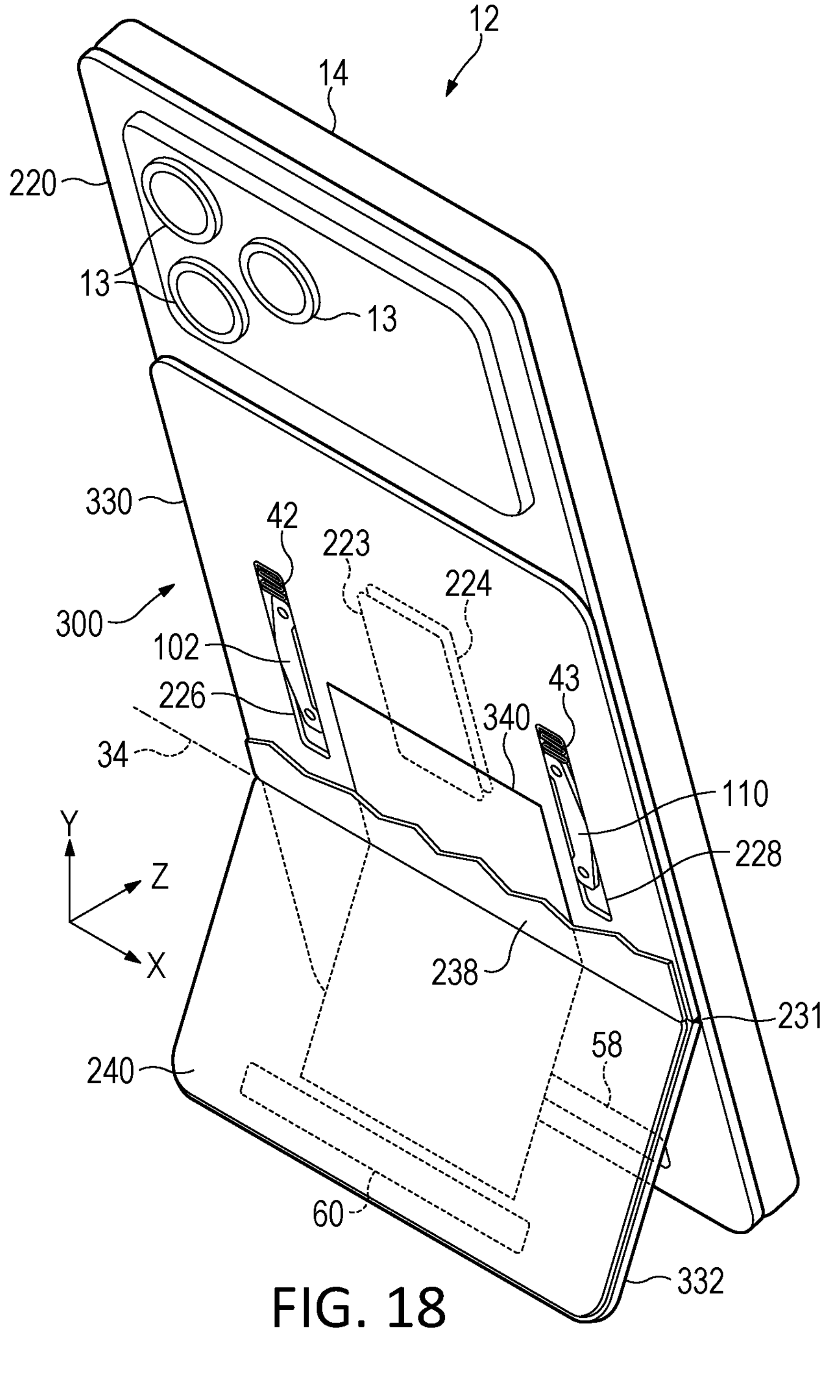
FIG. 18 shows the kickstand assembly of FIG. 17 in a mid-deployed position.

With reference now to FIGS. 17 and 18, in another example of kickstand assemblies of the present disclosure that utilize slots in the upper kickstand plate and sliders protruding from the backplate, a kickstand assembly 300 includes slots and corresponding sliders and springs as described above, except in this example the slots are vertically oriented relative to the longitudinal (long) axis of the computing device 12.

More particularly, in this example the upper kickstand plate 330 comprises first slot 226 and second slot 228 that extend in a direction perpendicular to the axis of rotation 34 of the lower kickstand plate 332 and are parallel to one another and spaced apart in the x-axis direction. Like the example described above and shown in FIGS. 12-16, in this example the backplate 220 comprises first slider 244 (covered by first capture member 102) that protrudes from the backplate and is slidably received in the first slot 226 of the upper kickstand plate 330. The backplate 220 also comprises second slider 246 (covered by second capture member 110) that protrudes from the backplate and is slidably received in the second slot 228 of the upper kickstand plate 330. First compression spring 42 is provided in the first slot 226, and second compression spring 43 is provided in the second slot 228. First slot 226, second slot 228, first slider 44, second slider 46, first compression spring 42, and second compression spring 43 utilize the same structure and interrelationship as described above. In other examples, kickstand assemblies of this configuration can include three, four, or more pairs of sliders and corresponding slots as described herein.

Advantageously, this configuration enables the upper kickstand plate 330 (and attached lower kickstand plate 332) to slide longitudinally in the y-axis direction relative to the backplate 220 and frame 14 of the portable computing device 12. As described further below, this configuration can enable a user to easily deploy the lower kickstand plate 332 by holding the portable computing device 12 and translating the upper kickstand plate 330 with one hand in the negative y-axis direction.

More particularly and with reference to FIG. 17, in this configuration the closing magnet 60 of the lower kickstand plate 332 overlies and magnetically attracts the backplate retention magnet 58 in the backplate 320 to releasably secure the lower kickstand plate to the backplate when the lower kickstand plate is in the rest position relative to the backplate. Advantageously, this configuration holds the lower kickstand plate 332 flush with the backplate surface.

As described above, the pre-loaded living hinge 231 urges the lower kickstand plate 332 to rotate away from the backplate 220. In this manner and as shown in FIG. 18, when the upper kickstand plate 330 is translated downwardly in the negative y-axis direction relative to the backplate 220 from the rest position, the closing magnet 60 is translated away from overlying the backplate retention magnet 58 to lessen the attractive force between the magnets, whereby the pre-loaded living hinge 231 causes the lower kickstand plate 332 to rotate about the upper kickstand plate into the angled, deployed position as shown in FIG. 18. Accordingly, and in another potential advantage of the present disclosure, this configuration easily and conveniently deploys the lower kickstand plate 332 when the upper kickstand plate 330 is longitudinally translated away from the rest position in the negative y-axis direction.

Additionally and like the example of FIGS. 10 and 11 described above, this configuration can enable a user to easily deploy the lower kickstand plate 332 with one hand. For example, a user may hold the portable computing device 12 in one hand, such as using a thumb and one or more fingers, and translate the upper kickstand plate 330 to release the lower kickstand plate using the index finger of that hand. Advantageously, such one-handed operation frees the other hand of the user for other activities.

Additionally, and like the other example described above, when the user releases the upper kickstand plate 330, the first compression spring 42 and second compression spring 43 expand to translate the upper kickstand plate and deployed lower kickstand plate 332 in the positive y-axis direction back into the rest position. It follows that this configuration both automatically deploys the lower kickstand plate 332 and returns the upper kickstand plate 330 to the rest position, thereby providing a stable and secure angled positioning of the portable computing device 12.

Figure 19:
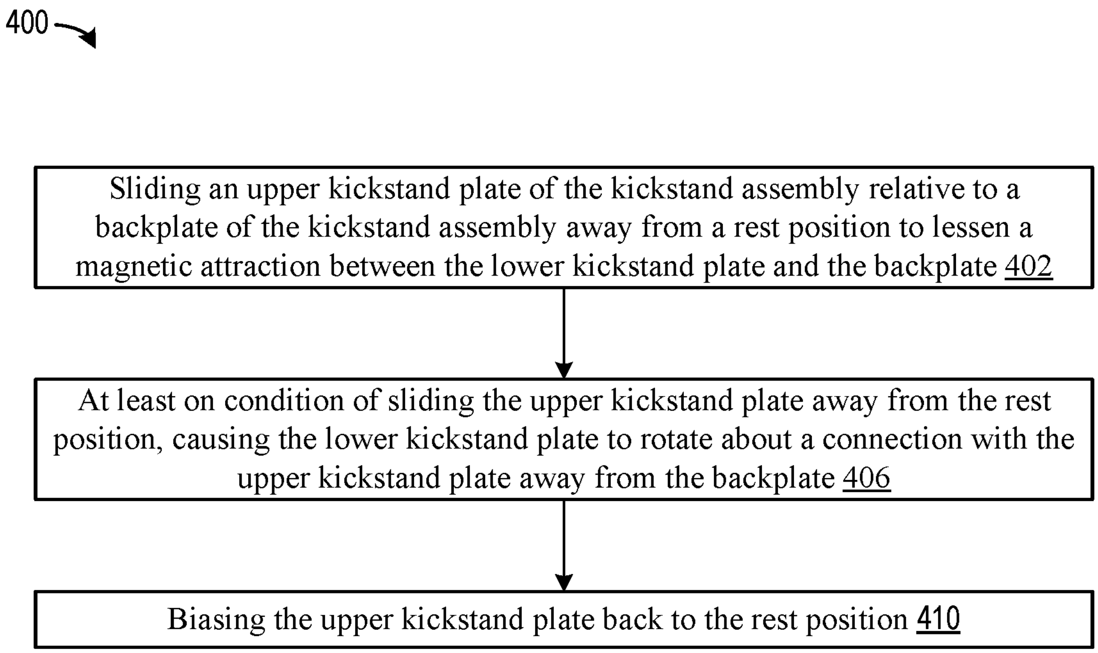
FIG. 19 shows a flow diagram of a method of deploying a lower kickstand plate of a kickstand assembly that is attached to a computing according to examples of the present disclosure.

Additionally, and similar to other example described above, in some examples the first slider 44 and second slider 46 have a slight freedom of movement in the x-axis direction to provide for lower frictional engagement and reduced possibilities of binding during movement in the y-axis direction. In these and other examples, the first slot and second slot can extend in a direction at least substantially perpendicular to the axis of rotation 34, and at least substantially parallel to one another. Alternatively expressed, in these and other examples the first slot and second slot can extend in a direction that is slightly diverging from perpendicular to the axis of rotation 34, and slightly diverging from parallel to one another, while still enabling movement of the sliders within the slots With reference now to FIG. 19, a flow diagram is provided depicting an example method 400 of deploying a lower kickstand plate of a kickstand assembly that is attached to a computing device. The following description of method 400 is provided with reference to the configurations and components described herein and shown in FIGS. 1-18. In different examples, the method 400 can be performed with the kickstand assemblies 10, 10', 100, 200, and 300 as described herein. In other examples, the method 400 can be performed with other configurations of kickstand assemblies and in other contexts using other suitable components.

At 402, the method 400 includes sliding an upper kickstand plate of the kickstand assembly relative to a backplate of the kickstand assembly away from a rest position to lessen a magnetic attraction between the lower kickstand plate and the backplate. At 406 the method 400 includes, at least on condition of sliding the upper kickstand plate away from the rest position, causing the lower kickstand plate to rotate about a connection with the upper kickstand plate away from the backplate. At 410 the method 400 includes biasing the upper kickstand plate back to the rest position.

The following paragraphs provide additional support for the claims of the subject application. One aspect provides a kickstand assembly for a computing device, the kickstand assembly comprising: a backplate comprising a backplate retention magnet having a first magnetic pole orientation; an upper kickstand plate slidably connected to the backplate; a return biaser that biases the upper kickstand plate toward a rest position; a lower kickstand plate rotatably coupled to the upper kickstand plate, the lower kickstand plate comprising a closing magnet having a second magnetic pole orientation that attracts the first magnetic pole orientation of the backplate retention magnet; and a deployment biaser that biases the lower kickstand plate to rotate away from the backplate, wherein the deployment biaser rotates the lower kickstand plate away from the backplate when the upper kickstand plate is translated away from the rest position. The kickstand assembly may additionally or alternatively include, wherein the deployment biaser is located at a kickstand hinge that rotatably couples the lower kickstand plate to the upper kickstand plate kickstand. The kickstand assembly may additionally or alternatively include, wherein the deployment biaser and the kickstand hinge comprise a living hinge. The kickstand assembly may additionally or alternatively include, wherein the backplate is a separate structure that is removably attached to the computing device. The kickstand assembly may additionally or alternatively include, wherein the backplate comprises a backplate accessory magnet configured to attract a frame accessory magnet in a frame of the computing device to removably attach the kickstand assembly to the frame. The kickstand assembly may additionally or alternatively include, wherein the backplate is also a rear face of a frame of the computing device. The kickstand assembly may additionally or alternatively include, wherein the backplate comprises a plurality of slots, and the upper kickstand plate comprises a plurality of sliders that are each slidably received in one slot of the plurality of slots in the backplate, wherein the return biaser is a first return biaser located in a first slot of the plurality of slots, further comprising a second return biaser located in a second slot of the plurality of slots. The kickstand assembly may additionally or alternatively include, wherein the lower kickstand plate is rotatably coupled to the upper kickstand plate at an axis of rotation, and each slot of the plurality of slots extends in a direction at least substantially perpendicular to the axis of rotation. The kickstand assembly may additionally or alternatively include, wherein the lower kickstand plate is rotatably coupled to the upper kickstand plate at an axis of rotation, and each slot of the plurality of slots extends in a direction at least substantially parallel to the axis of rotation. The kickstand assembly may additionally or alternatively include, wherein each of the sliders comprises an elongated member that comprises: a first end comprising a first slider upper bearing surface and a first slider lower bearing surface; and a second end comprising a second slider upper bearing surface and a second slider lower bearing surface. The kickstand assembly may additionally or alternatively include, wherein each of the sliders further comprises a recessed relief surface between the first end and the second end. The kickstand assembly may additionally or alternatively include a plurality of capture members, wherein each of the capture members is affixed to one of the sliders to retain the slider within the corresponding slot. The kickstand assembly may additionally or alternatively include, wherein the backplate comprises a plurality of sliders and the upper kickstand plate comprises a plurality of slots, wherein each of the sliders is slidably received in one slot of the plurality of slots. The kickstand assembly may additionally or alternatively include, wherein the lower kickstand plate is rotatably coupled to the upper kickstand plate at an axis of rotation, and each slot of the plurality of slots extends in a direction at least substantially perpendicular to the axis of rotation. The kickstand assembly may additionally or alternatively include, wherein the lower kickstand plate is rotatably coupled to the upper kickstand plate at an axis of rotation, and each slot of the plurality of slots extends in a direction at least substantially parallel to the axis of rotation. The kickstand assembly may additionally or alternatively include, wherein the backplate is a separate structure that is removably attached to the computing device. The kickstand assembly may additionally or alternatively include, wherein each of the sliders comprises an elongated member that comprises: a first end comprising a first slider upper bearing surface and a first slider lower bearing surface; and a second end comprising a second slider upper bearing surface and a second slider lower bearing surface.

Another aspect provides kickstand assembly for a computing device, the kickstand assembly comprising: a backplate comprising: a backplate retention magnet having a first magnetic pole orientation; a plurality of slots; and a backplate accessory magnet configured to attract a frame accessory magnet in a frame of the computing device to removably attach the kickstand assembly to the frame; an upper kickstand plate comprising a plurality of sliders that are each slidably received in one slot of the plurality of slots in the backplate; a return biaser that biases the upper kickstand plate toward a rest position; and a lower kickstand plate rotatably coupled to the upper kickstand plate and comprising: a deployment biaser that biases the lower kickstand plate to rotate away from the backplate; and a closing magnet having a second magnetic pole orientation that attracts the first magnetic pole orientation of the backplate retention magnet, wherein the deployment biaser rotates the lower kickstand plate away from the backplate when the upper kickstand plate is translated away from the rest position. The kickstand assembly may additionally or alternatively include, wherein the return biaser is a first return biaser located in a first slot of the plurality of slots defined in the backplate, further comprising a second return biaser located in a second slot of the plurality of slots, wherein the lower kickstand plate is rotatably coupled to the upper kickstand plate at an axis of rotation, and each slot of the plurality of slots extends in a direction at least substantially perpendicular to the axis of rotation.

Another aspect provides a method of deploying a lower kickstand plate of a kickstand assembly that is attached to a computing device, the method comprising: sliding an upper kickstand plate of the kickstand assembly relative to a backplate of the kickstand assembly away from a rest position to lessen a magnetic attraction between the lower kickstand plate and the backplate; at least on condition of sliding the upper kickstand plate away from the rest position, causing the lower kickstand plate to rotate about a connection with the upper kickstand plate away from the backplate; and biasing the upper kickstand plate back to the rest position.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed. In the descriptions provided herein, ordinal numbers such as first and second are used for convenience and ease of description, and do not denote any order or arrangement of components.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A kickstand assembly for a computing device, the kickstand assembly comprising:
- a backplate comprising a backplate retention magnet having a first magnetic pole orientation;
- an upper kickstand plate slidably connected to the backplate;
- a return biaser that biases the upper kickstand plate toward a rest position;
- a lower kickstand plate rotatably coupled to the upper kickstand plate, the lower kickstand plate comprising a closing magnet having a second magnetic pole orientation that attracts the first magnetic pole orientation of the backplate retention magnet; and
- a deployment biaser that biases the lower kickstand plate to rotate away from the backplate,
- wherein the deployment biaser rotates the lower kickstand plate away from the backplate when the upper kickstand plate is translated away from the rest position.

2. The kickstand assembly of claim 1, wherein the deployment biaser is located at a kickstand hinge that rotatably couples the lower kickstand plate to the upper kickstand plate kickstand.

3. The kickstand assembly of claim 2, wherein the deployment biaser and the kickstand hinge comprise a living hinge.

4. The kickstand assembly of claim 1, wherein the backplate is a separate structure that is removably attached to the computing device.

5. The kickstand assembly of claim 4, wherein the backplate comprises a backplate accessory magnet configured to attract a frame accessory magnet in a frame of the computing device to removably attach the kickstand assembly to the frame.

6. The kickstand assembly of claim 1, wherein the backplate is also a rear face of a frame of the computing device.

7. The kickstand assembly of claim 1, wherein the backplate comprises a plurality of slots, and the upper kickstand plate comprises a plurality of sliders that are each slidably received in one slot of the plurality of slots in the backplate, wherein the return biaser is a first return biaser located in a first slot of the plurality of slots, further comprising a second return biaser located in a second slot of the plurality of slots.

8. The kickstand assembly of claim 7, wherein the lower kickstand plate is rotatably coupled to the upper kickstand plate at an axis of rotation, and each slot of the plurality of slots extends in a direction at least substantially perpendicular to the axis of rotation.

9. The kickstand assembly of claim 7, wherein the lower kickstand plate is rotatably coupled to the upper kickstand plate at an axis of rotation, and each slot of the plurality of slots extends in a direction at least substantially parallel to the axis of rotation.

10. The kickstand assembly of claim 7, wherein each of the sliders comprises an elongated member that comprises:

a first end comprising a first slider upper bearing surface and a first slider lower bearing surface; and a second end comprising a second slider upper bearing surface and a second slider lower bearing surface.

11. The kickstand assembly of claim 10, wherein each of the sliders further comprises a recessed relief surface between the first end and the second end.

12. The kickstand assembly of claim 10, further comprising a plurality of capture members, wherein each of the capture members is affixed to one of the sliders to retain the slider within the corresponding slot.

13. The kickstand assembly of claim 1, wherein the backplate comprises a plurality of sliders and the upper kickstand plate comprises a plurality of slots, wherein each of the sliders is slidably received in one slot of the plurality of slots.

14. The kickstand assembly of claim 13, wherein the lower kickstand plate is rotatably coupled to the upper kickstand plate at an axis of rotation, and each slot of the plurality of slots extends in a direction at least substantially perpendicular to the axis of rotation.

15. The kickstand assembly of claim 13, wherein the lower kickstand plate is rotatably coupled to the upper kickstand plate at an axis of rotation, and each slot of the plurality of slots extends in a direction at least substantially parallel to the axis of rotation.

16. The kickstand assembly of claim 13, wherein the backplate is a separate structure that is removably attached to the computing device.

17. The kickstand assembly of claim 13, wherein each of the sliders comprises an elongated member that comprises:

a first end comprising a first slider upper bearing surface and a first slider lower bearing surface; and a second end comprising a second slider upper bearing surface and a second slider lower bearing surface.

18. A kickstand assembly for a computing device, the kickstand assembly comprising:

a backplate comprising:

a backplate retention magnet having a first magnetic pole orientation;

a plurality of slots; and a backplate accessory magnet configured to attract a frame accessory magnet in a frame of the computing device to removably attach the kickstand assembly to the frame;

an upper kickstand plate comprising a plurality of sliders that are each slidably received in one slot of the plurality of slots in the backplate;

a return biaser that biases the upper kickstand plate toward a rest position; and a lower kickstand plate rotatably coupled to the upper kickstand plate and comprising:

a deployment biaser that biases the lower kickstand plate to rotate away from the backplate; and a closing magnet having a second magnetic pole orientation that attracts the first magnetic pole orientation of the backplate retention magnet, wherein the deployment biaser rotates the lower kickstand plate away from the backplate when the upper kickstand plate is translated away from the rest position.

19. The kickstand assembly of claim 18, wherein the return biaser is a first return biaser located in a first slot of the plurality of slots defined in the backplate, further comprising a second return biaser located in a second slot of the plurality of slots, wherein the lower kickstand plate is rotatably coupled to the upper kickstand plate at an axis of rotation, and each slot of the plurality of slots extends in a direction at least substantially perpendicular to the axis of rotation.

* * * * *